United States Patent
Haimi-Cohen

(10) Patent No.: US 9,894,324 B2
(45) Date of Patent: Feb. 13, 2018

(54) METHOD AND SYSTEM FOR MODIFYING COMPRESSIVE SENSING BLOCK SIZES FOR VIDEO MONITORING USING DISTANCE INFORMATION

(71) Applicant: Alcatel-Lucent USA, Inc., Murray Hill, NJ (US)

(72) Inventor: Raziel Haimi-Cohen, Springfield, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 614 days.

(21) Appl. No.: 14/332,076

(22) Filed: Jul. 15, 2014

(65) Prior Publication Data
US 2016/0021390 A1 Jan. 21, 2016

(51) Int. Cl.
*H04N 19/563* (2014.01)
*H04N 7/18* (2006.01)

(52) U.S. Cl.
CPC .................. *H04N 7/181* (2013.01)

(58) Field of Classification Search
CPC ........................ H04N 19/139; H04N 19/563
USPC ................................... 375/240.24
See application file for complete search history.

(56) References Cited

U.S. PATENT DOCUMENTS

| | | | |
|---|---|---|---|
| 3,775,602 A | 11/1973 | Alexandridis et al. | |
| 5,070,403 A | 12/1991 | Wilkinson | |
| 5,166,788 A | 11/1992 | Lee | |
| 5,262,854 A | 11/1993 | Nq | |
| 5,555,023 A | 9/1996 | Maenaka et al. | |
| 5,572,552 A | 11/1996 | Dent et al. | |
| 5,870,144 A | 2/1999 | Guerrera | |
| 5,983,251 A | 11/1999 | Martens et al. | |
| 6,148,107 A | 11/2000 | Ducloux et al. | |
| 6,356,324 B1 | 3/2002 | Nishiguchi et al. | |
| 6,718,287 B2 | 4/2004 | Oostveen et al. | |

(Continued)

FOREIGN PATENT DOCUMENTS

| | | |
|---|---|---|
| CN | 101309404 A | 11/2008 |
| CN | 101964910 A | 2/2011 |

(Continued)

OTHER PUBLICATIONS

Office Action issued in co-pending U.S. Appl. No. 12/894,807, dated Oct. 5, 2015.

(Continued)

*Primary Examiner* — Nguyen Truong
(74) *Attorney, Agent, or Firm* — Harness, Dickey & Pierce, P.L.C.

(57) ABSTRACT

A method and a system for using compression sensing to provide low data rate transmission and low computational complexity to determine anomalies in video data obtained by a video camera or other motion detection device. The video data is divided into varying sized video blocks based on an anticipated size of objects of interest within the video, and based on a distance between a video camera and the objects of interest. Features are extracted from the video data of each block to detect anomalies if a feature vector is outside of an "allowed range." By utilizing varying sized video blocks, anomalies are more effectively and efficiently detected in the video data.

20 Claims, 11 Drawing Sheets

(56) References Cited

U.S. PATENT DOCUMENTS

| | | | |
|---|---|---|---|
| 6,806,903 B1* | 10/2004 | Okisu | G06K 9/38 348/222.1 |
| 6,954,501 B2 | 10/2005 | Skripin et al. | |
| 7,046,853 B2 | 5/2006 | Okada | |
| 7,227,895 B1 | 6/2007 | Wang et al. | |
| 7,345,603 B1 | 3/2008 | Wood et al. | |
| 7,680,356 B2 | 3/2010 | Boyce et al. | |
| 8,125,883 B2 | 2/2012 | Aulin | |
| 8,204,126 B2 | 6/2012 | Tsuda et al. | |
| 2002/0181789 A1 | 12/2002 | Okada | |
| 2003/0017846 A1 | 1/2003 | Estevez et al. | |
| 2003/0043918 A1 | 3/2003 | Jiang et al. | |
| 2003/0152147 A1* | 8/2003 | Akimoto | H04N 19/96 375/240.19 |
| 2003/0197898 A1 | 10/2003 | Battiato et al. | |
| 2004/0264580 A1 | 12/2004 | Chiang Wei Yin et al. | |
| 2005/0207498 A1 | 9/2005 | Vitali et al. | |
| 2006/0203904 A1 | 9/2006 | Lee | |
| 2006/0239336 A1 | 10/2006 | Baraniuk et al. | |
| 2007/0047838 A1 | 3/2007 | Milanfar et al. | |
| 2007/0242746 A1 | 10/2007 | Kishimoto et al. | |
| 2007/0285554 A1* | 12/2007 | Givon | G03H 1/268 348/340 |
| 2008/0025624 A1 | 1/2008 | Brady | |
| 2008/0117968 A1 | 5/2008 | Wang | |
| 2008/0130883 A1 | 6/2008 | Agaian et al. | |
| 2008/0152296 A1 | 6/2008 | Oh et al. | |
| 2009/0010337 A1 | 1/2009 | Wang | |
| 2009/0010338 A1 | 1/2009 | Wang | |
| 2009/0052585 A1 | 2/2009 | Song et al. | |
| 2009/0079876 A1 | 3/2009 | Takeshima et al. | |
| 2009/0222226 A1 | 9/2009 | Baraniuk et al. | |
| 2009/0316779 A1 | 12/2009 | Fukuhara et al. | |
| 2010/0027897 A1 | 2/2010 | Sole et al. | |
| 2010/0040299 A1 | 2/2010 | Noh et al. | |
| 2010/0091134 A1 | 4/2010 | Cooke et al. | |
| 2010/0165163 A1 | 7/2010 | Matsuda | |
| 2010/0189172 A1 | 7/2010 | Pateux et al. | |
| 2010/0246952 A1 | 9/2010 | Banner et al. | |
| 2011/0096833 A1 | 4/2011 | Wang et al. | |
| 2011/0150084 A1 | 6/2011 | Choi et al. | |
| 2011/0150087 A1 | 6/2011 | Kim et al. | |
| 2011/0276612 A1 | 11/2011 | Droz et al. | |
| 2011/0310972 A1 | 12/2011 | Wang et al. | |
| 2012/0051432 A1 | 3/2012 | Fernandes et al. | |
| 2012/0063641 A1* | 3/2012 | Venkatesh | G06K 9/00771 382/103 |
| 2012/0082208 A1 | 4/2012 | Jiang et al. | |
| 2012/0114039 A1 | 5/2012 | Wang | |
| 2012/0189047 A1 | 7/2012 | Jiang et al. | |
| 2013/0121422 A1 | 5/2013 | Jiang et al. | |
| 2014/0043491 A1* | 2/2014 | Jiang | H04N 19/14 348/180 |
| 2015/0178945 A1 | 6/2015 | Haimi-Cohen et al. | |
| 2016/0021390 A1 | 1/2016 | Haimi-Cohen | |

FOREIGN PATENT DOCUMENTS

| | | |
|---|---|---|
| CN | 102025999 A | 4/2011 |
| JP | 2003069832 A | 3/2003 |
| WO | WO-2009007580 A2 | 1/2009 |
| WO | WO-2011/081643 A2 | 7/2011 |

OTHER PUBLICATIONS

Budhaditya, et al., "Effective Anomaly Detection in Sensoro Networks Data Streams," *IEEE, 9th IEEE Int. Conf. on Data Mining 2009*, Dec. 9, 2009, pp. 722-727.

Office Action issued in co-pending U.S. Appl. No. 13/182,856, dated Aug. 16, 2013.

Cossalter M. et al., "Joint Compressive Video Coding and Analysis," IEEE Transactions on Multimedia, IEEE Service Center, Piscataway, NJ, US, vol. 12, No. 3, Apr. 1, 2010, pp. 168-183, XP011346672.

Dadkhan M.R. et al., "Compressive Sensing with Modified Total Variation Minimization Algorithm," Acoustic Speech and Signal Processing (ICASSP), 2010 IEEE International Conference ON, IEEE, Piscataway, NJ, USA, Mar. 14, 2010, pp. 1310-1313, XP031697373.

Huihui Bai et al., "Compressive Sensing for DCT Image," Computational Aspects of Social Networks (CASON), 2010 International Conference ON, IEEE, Piscataway, NJ, USA, Sep. 26, 2010, pp. 378-381, XP031802282.

Duarte M.F. et al., "Single-Pixel Imaging via Compressive Sampling," IEEE Signal Processing Magazine, IEEE Service Center, Piscataway, NJ, US, vol. 25, No. 2, Mar. 1, 2008, pp. 83-91, XP011225667.

Chengbo Li, "An Efficient Algorithm for Total Variation Regularization with Applications to the Single Pixel Camera and Compressive Sensing," Thesis Submitted in Partial Fulfillment of the Requirements for the Degree Master of Arts, Sep. 30, 2009, pp. 1-93, XP55010819, Retrieved from the internet: URL:http://scholarship.rice.edu/bitstream/handle/1911/62229/1486057. PDF?sequence=1 [Retrieved Oct. 31, 2011].

Chengbo Li et al., "Video Coding Using Compressive Sensing for Wireless Communications," Wireless Communications and Networking Conference (WCNC), 2011 IEEE, IEEE, Mar. 28, 2011, pp. 2077-2082, XP031876593.

Hong Jiang et al., "Arbitrary Resolution Video Coding Using Compressive Sensing," Workshop on Picture Coding and Image Processing 2010, Dec. 7, 2010 XP030082080.

International Search Report dated Nov. 14, 2011 for Application No. PCT/US2011/051726.

Robucci, Ryan, et al., "Compressive Sensing on a CMOS Seperable Transform Image Sensor," pp. 5125-5128, IEEE, 2008.

International Search Report and Written Opinion for PCT/US2011/051730 dated Dec. 15, 2011.

Dugad, R. et al., "A Fast Scheme for Image Size Change in the Compressed Domain," IEEE Transactions on Circuits and Systems for Video Technology, vol. 11, No. 4, Apr. 1, 2011.

Deng, C. et al., "Robust image compression based on compressive sensing," Multimedia and Expo (ICME), Jul. 19, 2012, pp. 462-467.

Hyder, M. et al., "A Scalable Distributed Video Coder Using Compressed Sensing," India Conference, Dec. 8, 2009, pp. 1-4.

Gao, D. et al., "A Robust Image Transmission Scheme for Wireless Channels Based on Compressive Sensing," Aug. 18, 2012, pp. 334-341.

International Search Report dated Feb. 29, 2012.

Park and Wakin, "A multiscale framework for compressive sensing of video," in Picture Coding Simposium, Chicago, IL, May 2009.

Drori, Iddo, "Compressed Video Sensing", BMVA symposium on 3D video analysis, display, and applications, 2008.

Wakin et al., "Compressive imaging for video representation and coding", in Picture Coding Symposium, (Beijing, China), Apr. 2006.

Office Action issued in co-pending U.S. Appl. No. 13/182,856 dated Feb. 13, 2014.

CCD and CMOS sensor technology, 2010, Axis Communications, pp. 1-8.

Jan Bogaerts et al., High-End CMOS Active Pixel Sensors for Space-Borne Imaging Instruments, 2005, FillFactory. pp. 1-9.

Roger William Doering, A Tricolor Digital/Micromirror Video Chip, 2001, UCLA, pp. 1-180.

Tarek Ouni et al., New low complexity DCT based video compression method, 2009, ICT 09, pp. 202-207.

R. Turchetta et al., Monolithic active pixel sensor (MAPS) in VLSI CMOS technology, 2003, Science Direct, pp. 1-9.

Sahng-Gyu Partk, Adaptive Lossless Video Compression, 2003, Purdue University, pp. 1-105.

Office Action dated Oct. 1, 2012 for co-pending U.S. Appl. No. 12/894,855.

Office Action issued in co-pending U.S. Appl. No. 12/894,855 dated Mar. 4, 2013.

International Preliminary Report on Patentability for PCT/US2011/051726 dated Apr. 2, 2013.

(56) References Cited

OTHER PUBLICATIONS

Written Opinion for PCT/US2011/051726 dated Nov. 14, 2011.
Written Opinion for PCT/US2011/051730 dated Dec. 15, 2011.
International Preliminary Report on Patentability for PCT/US2011/051730 dated Apr. 2, 2013.
International Preliminary Report on Patentability PCT/US2011/056088 dated Apr. 2, 2013.
Written Opinion for PCT/US2011/056088 dated Feb. 29, 2012.
L.R. Rabiner and B. Gold, Theory and Application of Digital Signal Processing, ch. 6, sec. 6.17, pp. 393-399. Prentice Hall, 1975.
Huang, Gang et al. "Lensless Compressive Sensing Imaging," Jan. 2013, pp. 1-12.
Office Action dated Jun. 18, 2014 in related U.S. Appl. No. 13/213,743.
International Search Report for PCT/US2011/056088 dated Feb. 26, 2012.
International Search Report for PCT/US2014/066035 dated Feb. 26, 2015.
Written Opinion of the International Searching Authority for PCT/US2014/066035 dated Feb. 26, 2015.
Narayanan, S. et al., "Camera Motion Estimation Using Circulant Compressive Sensing Matrices," 2013 9th International Conference on Information, Communications and Signal Processing, *IEEE*, Dec. 10, 2013, pp. 1-5 (XP032584530).
Majumdar, A., "A Sparsity Based Approach Towards Fast MRI Acquisition," Jul. 19, 2012 (XP055123105).
Willett, R.M. et al., "Compressed Sensing for Practical Optical Imaging Systems: A Tutorial," SPIE, *Optical Engineering*, vol. 50, No. 7, Jul. 6, 2011, pp. 1-13 (XP040561676).
U.S. Appl. No. 12/894,855, filed Sep. 30, 2010.
U.S. Appl. No. 13/213,743, filed Aug. 19, 2011.
U.S. Appl. No. 13/182,856, filed Jul. 14, 2011.
U.S. Appl. No. 14/136,803, filed Dec. 20, 2013.

\* cited by examiner

METHOD AND SYSTEM FOR MODIFYING COMPRESSIVE SENSING BLOCK SIZES FOR VIDEO MONITORING USING DISTANCE INFORMATION

BACKGROUND OF THE INVENTION

Field of the Invention

Example embodiments relate generally to video surveillance monitoring, and more particularly to a method and system for using distance information to determine compressive sensing block sizes for detecting an anomaly in the video while utilizing a low data rate transmission.

Related Art

Security and video monitoring applications may use one or more video monitoring cameras. Typically, the video monitoring is used to detect visual anomalies, which may be defined as any event which is out of the ordinary. Detection of an anomaly may require automatic action or further investigation, either by alerting a human operator or forwarding video data to another location for further analysis.

Detection of anomalies conventionally requires monitoring of the video cameras in real-time. Monitoring the cameras in real-time also conventionally requires transmission of the captured video over a network to a control center. Transmission of captured video data or a video stream in real-time generally requires compression of the captured video data (using conventional compression standards such as H.264), transmission of the compressed video data, decompression of the video data in real-time, and displaying of the decompressed video data. Human operators are also often required to watch the reconstructed video data continuously, in order to detect anomalies.

In many video monitoring applications, hundreds or thousands of video streams may need to be compressed, decompressed, reconstructed and observed by one or more human operators. Therefore, large amounts of network and/or computing resources may be needed to continuously review the video in real-time. Additionally, the cost of employing human operators to review the video may be prohibitively costly, while some anomalies may go undetected due to operator fatigue and/or other human errors.

SUMMARY OF INVENTION

Example embodiments provide a method and system for using low data rate transmission and low computational complexity to determine anomalies in video data. To this end, a video stream from one or more video cameras may utilize compressive sensing to divide the video into spatiotemporal blocks of varying sizes (that may be disjointed or overlapping) where features may be extracted from video data of each block. Features may characterize each block. An anomaly may be detected if a feature vector of a block is outside of an "allowed range" within the feature space. Distance information may be used in order to determine optimal video block sizes to more accurately detect the anomalies.

In one embodiment, a method of generating a measurement vector to detect an anomaly, comprises acquiring, by at least one device controlled by one or more processors, video data; dividing, by the one or more processors, the video data into a plurality of video blocks, determining, by the one or more processors, at least a first block size of at least a first video block of the plurality of video blocks, the first block size being based on distance information; generating, by the one or more processors, a set of compressive measurements by applying a sensing matrix to the first video block; and generating, by the one or more processors, a measurement vector based on the set of compressive measurements, the measurement vector being used to detect an anomaly in the first video block.

In one embodiment, a method of detecting an anomaly, comprises receiving, at a server, at least one measurement vector of compressive measurements for an object in a video block of data, the at least one measurement vector being derived by applying a sensing matrix to the video block; estimating, at the server, actual speed information of an object in the video block based on the measurement vector, the actual speed information being based on distance information for the object; and detecting an anomaly of the video block based on the actual speed information.

In one embodiment, a system for generating a measurement vector to detect an anomaly, comprises at least one device configured to, acquire video data, divide the video data into a plurality of video blocks, determine at least a first block size of at least a first video block of the plurality of video blocks, the first block size being based on distance information, generate a set of compressive measurements by applying a sensing matrix to the first video block, and generate a measurement vector based on the set of compressive measurements, the measurement vector being used to detect an anomaly in the first video block.

In one embodiment, a server for detecting an anomaly, is configured to receive at least one measurement vector of compressive measurements for an object in a video block of data, the at least one measurement vector being derived by applying a sensing matrix to the video block, estimate actual speed information of an object in the video block based on the measurement vector, the actual speed information being based on distance information for the object, and detect an anomaly of the video block based on the actual speed information.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Figure 1:
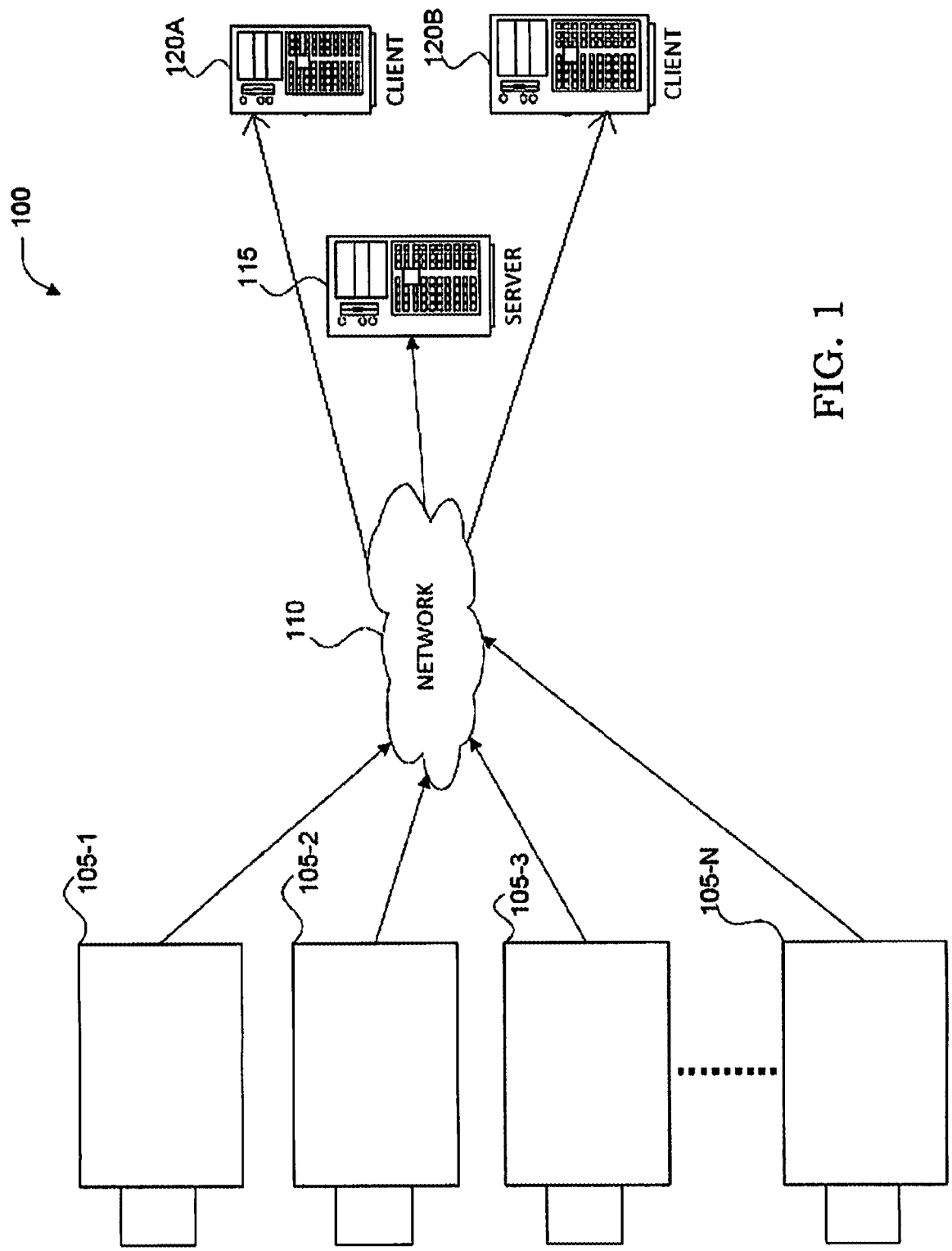
FIG. 1 is a diagram of a communication network for video monitoring, in accordance with an example embodiment.

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium, such as a non-transitory storage medium. A processor(s) may perform the necessary tasks.

Specific structural and functional details disclosed herein are merely representative for purposes of describing example embodiments. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be any non-transitory storage medium such as magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Example embodiments provide methods and systems for modifying compressive sensing block sizes in order to detect anomalies in video data without involving a human operator and/or without requiring an excessive amount of computational and/or network resources. Additionally, example embodiments provide methods and systems for detecting anomalies in compressed video data without reconstructing the compressed video data.

Anomalies may be characterized as any deviation, departure, or change from a normal and/or common order, arrangement, and/or form. In a source signal and/or video data, an anomaly may be defined as any difference between two or more images, video frames, and/or other like data structure. For example, in a network of cameras monitoring a crossroad and/or intersection of streets, an anomaly may be defined as any change in an image or video frame that is detected by the network of cameras, which is different than one or more other images or video frames. In various embodiments, anomalies may be characterized as a motion and/or movement in a location and/or position, where no movement should be present. Additionally, an anomaly may be characterized as an unexpected motion and/or movement in a desired location and/or position, where a desired motion usually occurs. For example, in a network of cameras monitoring a crossroad and/or intersection of streets, an anomaly may be defined as motion in a direction that is not allowed by traffic laws at the intersection, a speed of a vehicle at the intersection above a desired threshold, and/or a motion that is outside a desired boundary or boundaries of the streets.

Furthermore, "anomaly detection" may be characterized as any form of recognizing, characterizing, extracting, or otherwise discovering any information about an anomaly. In various embodiments, anomaly detection may include determining that an anomaly exists, estimating a likelihood and/or probability that an anomaly exists, and/or ascertaining or otherwise discovering information about an anomaly or estimated anomaly (e.g., a location, direction, and/or speed of one or more moving objects).

FIG. 1 illustrates an example of a communications network 100, according to an example embodiment. The communications network 100 may include motion detection devices 105-1-105-N, a network 110, a server 115, and client devices 120A-B.

Each of the motion detection devices 105-1-105-N (where N≥1) may include a transceiver, memory, and processor. Motion detection devices 105 may be configured to send/receive data to/from server 115. Motion detection devices 105 may be designed to sequentially and automatically carry out a sequence of arithmetic or logical operations; equipped to record/store digital data on a machine readable medium; and transmit and receive digital data via network 110. Motion detection devices 105 may be any image and/or motion capture device, such as a digital camera, a lens-less image capture device, and/or any other physical or logical device capable of capturing, recording, storing, and/or transferring captured video data via network 110. Each of the motion detection devices 105 may include a wired transmitter or a wireless transmitter configured to operate in accordance with wireless communications standards, such as CDMA, GSM, LTE, WiMAX, or other like wireless communications standards.

Each of the motion detection devices 105 may be configured to encode and/or compress captured video data (or alternatively, a "video stream") using compressive sensing (or alternatively, compressed sensing, compressive sampling, or sparse sampling). Compressive sensing is a signal processing technique that allows an entire signal to be determined from relatively few measurements. Compressive sensing includes applying a sensing matrix (often referred to as a measurement matrix) to a source signal and obtaining a set of measurements (often referred to as a measurement vector). The sensing matrix may include a pattern of assigned values. The pattern of assigned values of the sensing matrix may be constructed using a fast transform matrix, such as a Walsh-Hadamard matrix, a circulant matrix, a Discrete Fourier Transform matrix (DFT), and/or any other like matrix. Additionally, in various embodiments, compressive measurements may be generated by spatial-temporal integration, as described in co-pending U.S. application Ser. No. 12/894,855, co-pending U.S. application Ser. No. 13/213,743, co-pending U.S. application Ser. No. 13/182,856 and/or co-pending U.S. application Ser. No. 14/136,803, which are each hereby incorporated by reference in their entirety.

Network 110 may be any network that allows computers to exchange data. Network 110 may include one or more network elements (not shown) capable of physically or logically connecting computers. In various embodiments, network 110 may be the Internet. In various embodiments, network 110 may be may be a Wide Area Network (WAN) or other like network that covers a broad area, such as a personal area network (PAN), local area network (LAN), campus area network (CAN), metropolitan area network (MAN), a virtual local area network (VLAN), or other like networks capable of physically or logically connecting computers. Additionally, in various embodiments, network 110 may be a private and/or secure network, which is used by a single organization (e.g., a business, a school, a government agency, and the like).

Server 115 is a network element that may include one or more systems and/or applications for processing a source signal (e.g., a signal captured by at least one of the motion detection devices 105) for anomaly detection in the source signal. Server 115 may include a processor, memory or computer readable storage medium, and a network interface. In some embodiments, server 115 may include a transmitter/receiver connected to one or more antennas. The server 115 may be any network element capable of receiving and responding to requests from one or more client devices (e.g., clients 120A-B) across a computer network (e.g., network 110) to provide one or more services. Accordingly, server 115 may be configured to communicate with the motion detection devices 105 and clients 120A-B via a wired or wireless protocol. Additionally, server 115 may be a single physical hardware device, or server 115 may be physically or logically connected with other network devices, such that the server 115 may reside on one or more physical hardware devices.

In various embodiments, server 115 is configured to operate an anomaly determination algorithm and/or routine. According to various embodiments, server 115 may be configured to receive one or more source signals and/or video streams, as measured and/or recorded by the motion detection devices 105, and determine and/or detect an anomaly in the source signal and/or video stream. In such embodiments, server 115 may also be configured to notify one or more client devices (e.g., clients 120A-B) when an anomaly has been detected by issuing a flag, or otherwise indicating, that an anomaly has been detected.

Client devices 120A-B may be a hardware computing device capable of communicating with a server (e.g., server 115), such that client devices 120A-B are able to receive services from the server. Client devices 120A-B may include memory, one or more processors, and (optionally) transceiver. Client devices 120A-B may be configured to send/receive data to/from network devices, such as a router, switch, or other like network devices, via a wired or wireless connection. Client devices 120A-B may be designed to sequentially and automatically carry out a sequence of arithmetic or logical operations; equipped to record/store digital data on a machine readable medium; and transmit and receive digital data via one or more network devices. Client devices 120A-B may include devices such as desktop computers, laptop computers, cellular phones, tablet personal computers, and/or any other physical or logical device capable of recording, storing, and/or transferring digital data via a connection to a network device. Client devices 120A-B may include a wireless transceiver configured to operate in accordance with one or more wireless standards.

As shown in FIG. 1, only two client devices 120A-B and a single server 115 are present. According to various embodiments, multiple client devices, multiple servers, and/or any number of databases (not shown) may be present. Additionally, in some embodiments, client devices 120A-B and server 115 may be virtual machines, and/or they may be provided as part of a cloud computing service. In various embodiments, client devices 120A-B and server 115 may reside on one physical hardware device, and/or may be otherwise fully integrated with one another, such that, in various embodiments, one or more operations that are performed by server 115 may be performed by client devices 120A-B.

Figure 2:
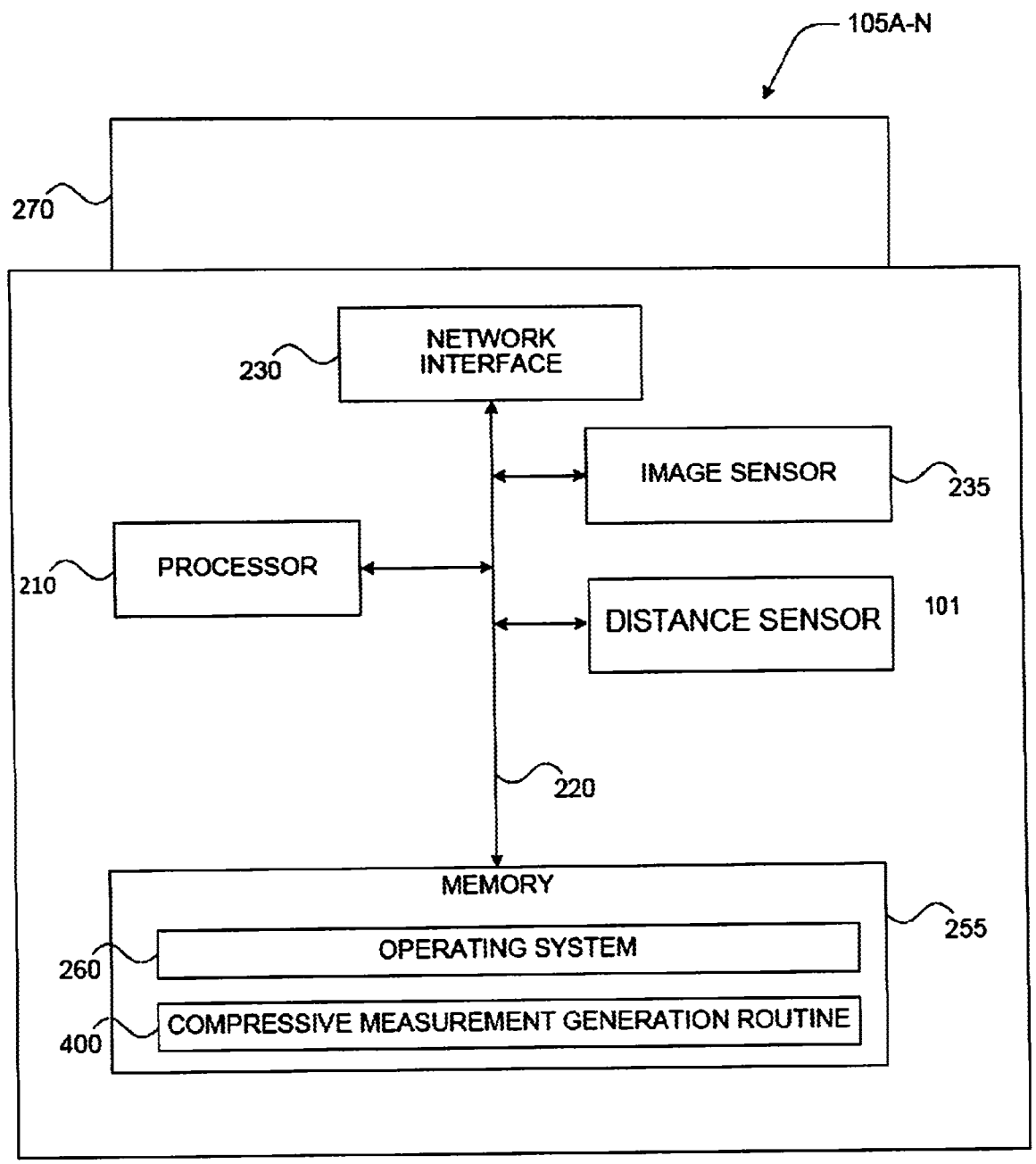
FIG. 2 illustrates the components of a motion detection device employed by the communication network of FIG. 1, in accordance with an example embodiment.

FIG. 2 illustrates the components of motion detection device 105 being employed by communications network 100, according to an example embodiment. As shown, the motion detection device 105 may include processor 210, bus 220, network interface 230, memory 255, image capture mechanism 270, and a distance sensor 101. During operation, memory 255 includes operating system 260, and compressive measurement generation routine 400. In some embodiments, the motion detection device 105 may include many more components than those shown in FIG. 2. However, it is not necessary that all of these generally conventional components be shown in order to understand the illustrative embodiment. Additionally, it should be noted that any one of the motion detection devices 105 may have the same or similar components as shown in FIG. 2

Memory 255 may be a computer readable storage medium that generally includes a random access memory (RAM), read only memory (ROM), and/or a permanent mass storage device, such as a disk drive. Memory 255 also stores operating system 260 and program code for compressive measurement generation routine 400. These software modules may also be loaded from a separate computer readable storage medium into memory 255 using a drive mechanism (not shown). Such separate computer readable storage medium may include a floppy drive, disc, tape, DVD/CD-ROM drive, memory card, or other like computer readable storage medium (not shown). In some embodiments, software modules may be loaded into memory 255 via network interface 230, rather than via a computer readable storage medium. It should also be understood that the memory 255 with operating system 260 and compressive measurement generation routine 400 may be separate from the motion detection device 105 (and have a separate processor controlling the operation of the operating system 260 and compressive measurement generation routine 400), such that the motion detection device 105 may interface with this separate device.

Processor 210 may be configured as a special purpose processor to carry out instructions of a computer program by performing the basic arithmetic, logical, and input/output operations of the system. Instructions may be loaded onto the processor 210 by memory 255 via bus 220 in order to configure processor 210 to encode and/or compress a source signal and/or captured video data using compressive sensing using distance information (for instance, processor 210 may be configured to perform any of the methods steps of instant FIGS. 4, 5 and 11). Additionally, processor 210 is configured to generate a set of compressive measurements based on the compressive sensing. In such embodiments, the compressive measurements may be generated using spatial-temporal integration, as described above with regard to FIG. 1, and/or as described in co-pending U.S. application Ser. No. 12/894,855, co-pending U.S. application Ser. No. 13/213,743, co-pending U.S. application Ser. No. 13/182,856 and/or co-pending U.S. application Ser. No. 14/136,803, which are each incorporated by reference in their entirety.

Bus 220 enables the communication and data transfer between the components of the motion detection device 105. Bus 220 may comprise a high-speed serial bus, parallel bus, storage area network (SAN), and/or other suitable communication technology.

Network interface 230 is a computer hardware component that connects the motion detection device 105 to a computer network. Network interface 230 may connect the motion detection device 105 to a computer network via a wired or wireless connection. Accordingly, motion detection device 105 may be configured to communicate with one or more servers (e.g., server 115) via the network interface 230.

Image capture mechanism 270 includes any mechanism for acquiring video data. Image capture mechanism 270 may include an optical lens, an image sensor (e.g., a charge-coupled device (CCD), a complementary metal-oxide-semiconductor (CMOS) sensor chip, active-pixel sensor (APS), and the like), and/or any like device that is capable of turning light into electrical and/or digital signals.

In some embodiments, at least some of the functionality of the processor 210 may be incorporated into the image sensor 235. For example, image capture mechanism 270 may include a lens-less image capture mechanism. Some lens-less image capture mechanisms may include an aperture assembly and a sensor. The aperture assembly may include a two dimensional array of aperture elements, and the sensor may be a single detection element, such as a single photo-conductive cell. Each aperture element together with the sensor may define a cone of a bundle of rays, and the cones of the aperture assembly define the pixels of an image. Each combination of pixel values of an image, defined by the bundle of rays, may correspond to a row in a sensing matrix. The integration of the bundle of rays in a cone by the sensor may be used for taking compressive measurements, without computing the pixels. In such embodiments, the lens-less camera may perform the functionality of the image sensor 235 and some of the functionality of the processor 210.

A distance sensor 101 may be included in the motion detection device 105. Or alternatively, the motion detection device 105 may interface with a distance sensor 101 that is separate from the motion detection device 105, where the distance sensor 101 may be controlled by a processor that is separate from the processor 210 of the motion detection device 105. The distance sensor 101 may be used to measure a distance between the motion detection device 105 and objects viewed by the motion detection device 105 (as described in more detail with regard to FIGS. 6-11). Such objects may be background objects, such as roads, buildings or trees, or they may be moving objects, such as cars, people walking, etc. Distance information obtained from the distance sensor 101 may be combined with captured images of the objects 103 (see FIGS. 6-10 in particular), and this distance information may be saved to memory 255 so that the compressive measurement generation routine 400 (see FIG. 4) may determine video block sizes for use in compressive sensing (see the method of determining the block sizes, discussed in detail in conjunction with FIG. 11, below).

It should be noted that, although an example of a lens-less image capture mechanism is described above, any type of measurements generation mechanism which implements some of the functionality of the processor 210 in the analog domain, or as a part of the image capturing device, may be used. Additionally, although FIG. 2 shows that image capture mechanism 270 is attached to motion detection device 105, in some embodiments image capture mechanism 270 may be a separate device that is connected to the other components of the motion detection device 105.

Figure 3:
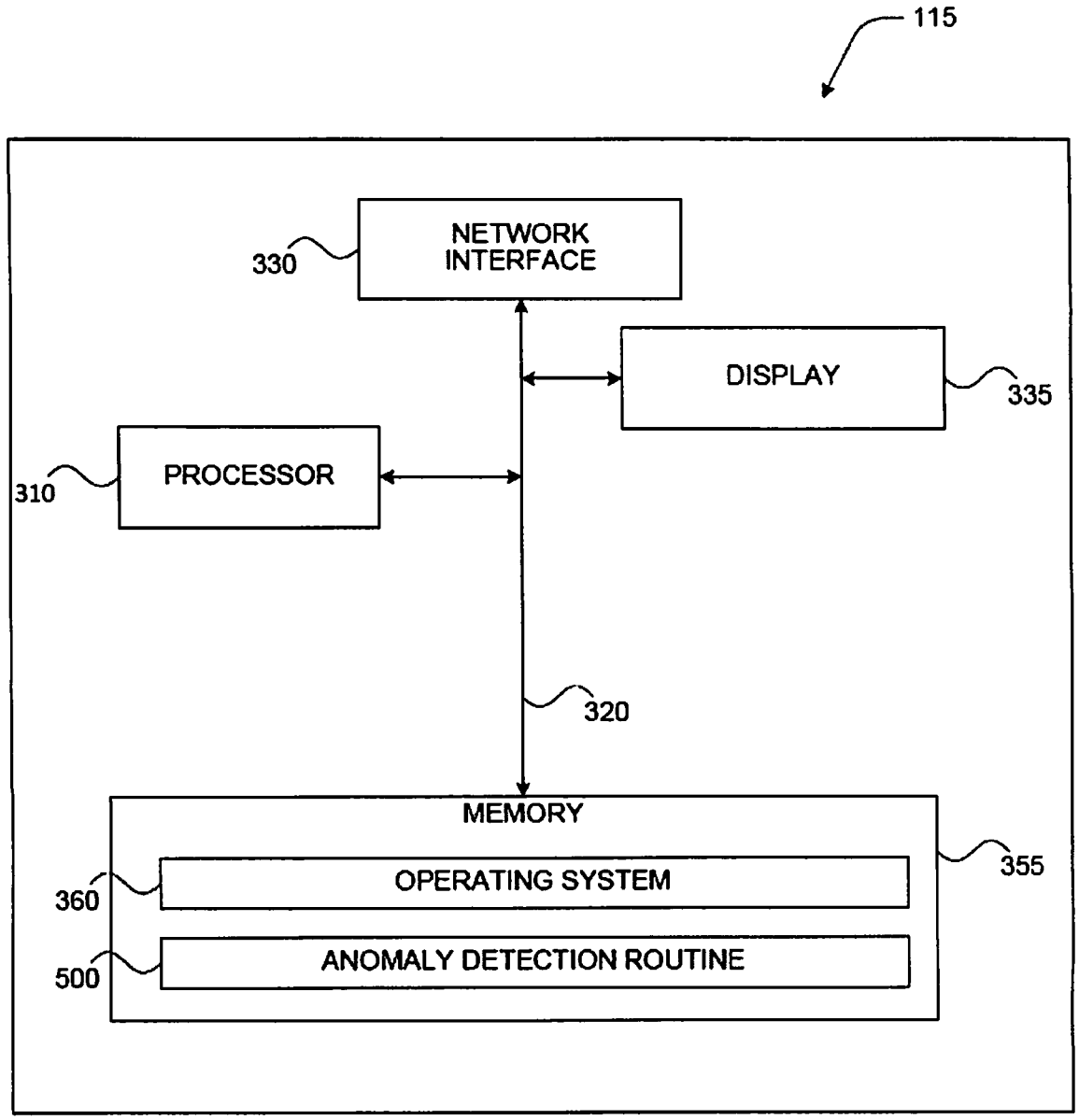
FIG. 3 illustrates the components of a signal processing server employed by the communication network of FIG. 1, in accordance with an example embodiment.

FIG. 3 illustrates the components of server 115 being employed by communications network 100, according to an example embodiment. As shown, the server 115 includes processor 310, bus 320, network interface 330, display 335, and memory 355. During operation, memory 355 includes operating system 360 and anomaly detection routine 500. In some embodiments, the server 115 may include many more components than those shown in FIG. 3. However, it is not necessary that all of these generally conventional components be shown in order to understand the illustrative embodiment.

Memory 355 may be a computer readable storage medium that generally includes a random access memory (RAM), read only memory (ROM), and/or a permanent mass storage device, such as a disk drive. Memory 355 also stores operating system 360 and anomaly detection routine 500. In various embodiments, the memory 355 may include an edge detection routine (not shown). These software modules may also be loaded from a separate computer readable storage medium into memory 355 using a drive mechanism (not shown). Such separate computer readable storage medium may include a floppy drive, disc, tape, DVD/CD-ROM drive, memory card, or other like computer readable storage medium (not shown). In some embodiments, software modules may be loaded into memory 355 via network interface 330, rather than via a computer readable storage medium.

Processor 310 may be configured as a special purpose processor to carry out instructions of a computer program by performing the basic arithmetical, logical, and input/output operations of the system. Instructions may be loaded onto the processor 310 by memory 355 via bus 320 in order to configured processor 310 to detect anomalies in video data (for instance, processor 310 may be configured to perform any of the method steps of FIG. 5).

Bus 320 enables the communication and data transfer between the components of the server 115. Bus 320 may comprise a high-speed serial bus, parallel bus, storage area network (SAN), and/or other suitable communication technology.

Network interface 330 is a computer hardware component that connects the server 115 to a computer network. Network interface 330 may connect the server 115 to a computer network via a wired or wireless connection. Accordingly, server 115 may be configured to communicate with one or more serving base stations via the network interface 330.

It should be noted that in various embodiments, the motion detection devices 105 and the server 110 may be integrated into one unit, such that both the motion detection devices 105 and the server 110 may reside on one physical hardware device. In such embodiments, the components of the motion detection devices 105 and the server 110 as shown in FIGS. 2 and 3, respectively, may be provided by a single component, such as a single processor, a single memory, and the like. Additionally, in such embodiments, some of the components of the motion detection devices 105 and the server 110 may not be required, such as a network interface for communicating over a network.

Figure 4:
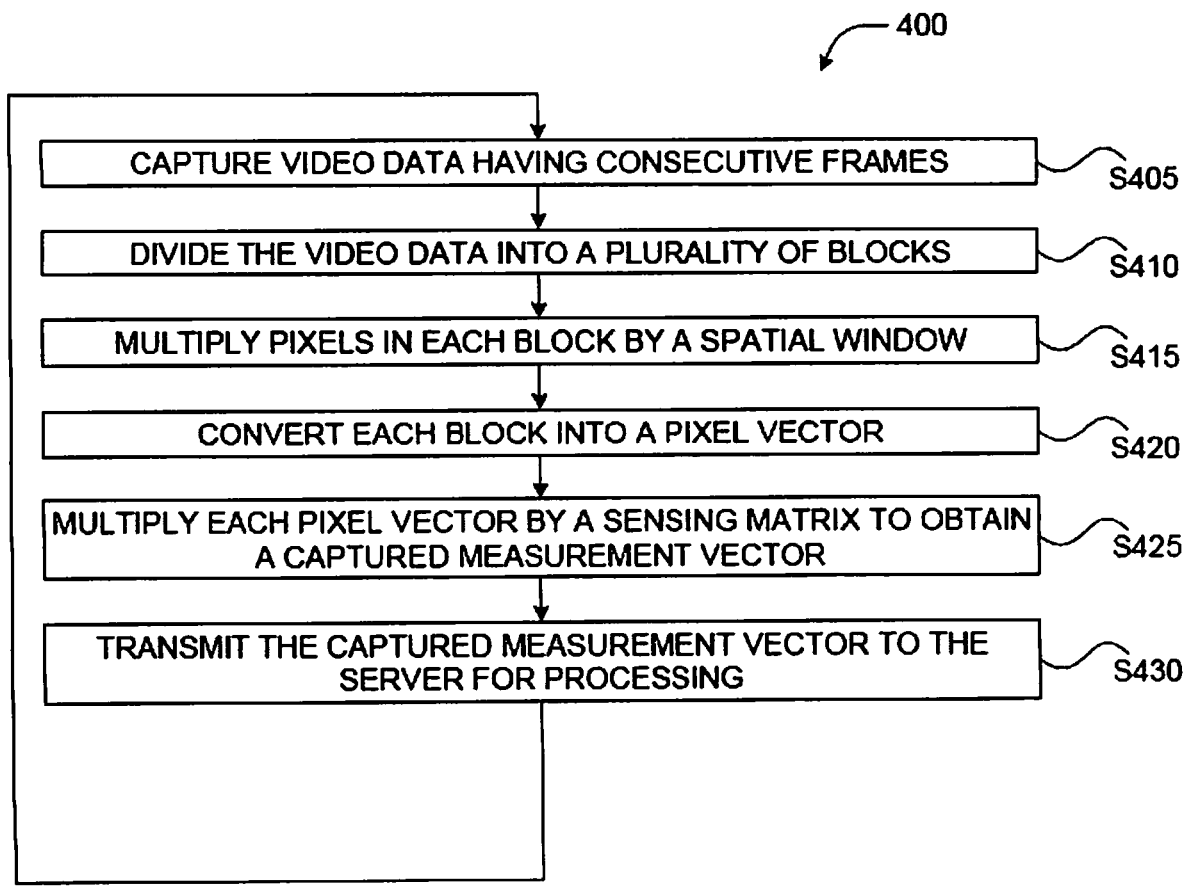
FIG. 4 shows a compressive measurement generation routine, in accordance with an example embodiment.

FIG. 4 shows a compressive measurement generation routine 400, according to an example embodiment. Compressive measurement generation routine 400 may be used to generate a set of measurements, which represent captured signals and/or video data, for encoding and/or compressing. For illustrative purposes, the operations of compressive measurement generation routine 400 will be described as being performed by the motion detection device 105 as described above with respect to FIG. 2. However, it should be noted that other similar image capture devices may operate the compressive measurement generation routine 400 as described below.

Referring to FIG. 4, as shown in operation S405, the motion detection device 105 captures video data having consecutive frames. As discussed above, the motion detection device 105 includes an image capture mechanism (e.g., image capture mechanism 270) configured to capture video data and/or a source signal. Thus, in operation S405, the motion detection device 105 captures video data using an associated image capture mechanism. This may also be referred to as the "original video" or "captured video".

A signal of length N may be represented by:

$$x = [x(0), \ldots, x(N-1)]^T \quad \text{[equation 1]}$$

A translation of x by a shift d is a signal $\tilde{x} = T^d x = [\tilde{x}(0), \ldots, \tilde{x}(N-1)]^T$ where $\tilde{x}(n) = x(n-d)$. Points and/or portions of the translation signal whose indices correspond to indices of the original signal, which are out of the original signal's defined domain, may be referred to as "out-of-domain cases". Out-of-domain cases may exist where $n-d<0$ or $n-d \geq N$. For example, $x(n-d)$ may be defined as zero in the edge cases. Alternatively, the signal may be extended in a periodic manner, as shown in equation 2:

$$x(n-d) = x(n-d \bmod(N)) \quad \text{[equation 2]}$$

In equation 2, $n-d \bmod(N)$ is the integer $0 \leq k < N$ such that $n-d-k$ is divisible by N. If the signal x is a multi-dimensional signal, the shift parameter d becomes a vector, where each component represents a shift in a particular dimension.

In various embodiments, multi-dimensional signals may be serialized into one-dimensional (1D) vectors prior to processing. In such embodiments, the serialization can be done in such a way that allows conversion of the shift vector d into a scalar. The conversion of a shift vector into a scalar may be done in such a way that shifting the original multi-dimensional signal by the shift vector and then serializing may be equivalent or similar to serializing the multi-dimensional signal first, and then shifting the 1D vectors by the scalar shift. It should be noted that, in various embodiments, the translation parameter d may be represented in other forms and represent various transformations of the signal, such as translations, shifts, and/or rotations.

A measurement vector may be obtained by applying a sensing matrix to a signal, as shown in equation 3.

$$y = \Phi x \qquad \text{[equation 3]}$$

In equation 3, $\Phi$ is a sensing matrix and the signal is represented by x.

Equation 4 represents a feature vector extracted from the measurement vector.

$$z = \Psi y \qquad \text{[equation 4]}$$

In equation 4, $\Psi$ represents a processing method, which may preserve some features that characterize the measurement vector y and the signal x. In the following it is assumed that $\Psi$ is a linear operator, for example the entries of z may be a subset of the entries of y. However, some embodiments may use other, non-linear operators to derive feature vectors. Similarly, a translation measurement vector and a translation feature vector may define the measurement vector and feature vector derived from a translated signal as shown in equation 5, equation 6, and equation 7, respectively.

$$\tilde{x} = T^d x \qquad \text{[equation 5]}$$

$$\tilde{y} = \Phi \tilde{x} = \Phi T^d x \qquad \text{[equation 6]}$$

$$\tilde{z} = \Psi \tilde{y} = \Psi \Phi T^d x \qquad \text{[equation 7]}$$

It should be noted that the terms "translation measurement vector" and "translation feature vector," do not imply that the measurement vector or feature vectors are actually shifted or translated, but that they correspond to a translation of the original signal, as depicted in and expressed by equation 6 and equation 7, as shown above.

Equation 8 shows computational steps of computing a measurement vector, a feature vector, a translated signal, a translation measurement vector, and a translation feature vector, according to an example embodiment.

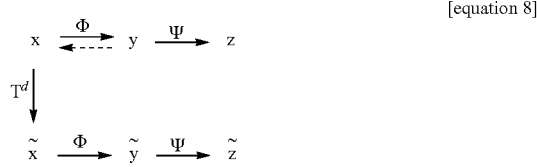

[equation 8]

The dimension of a measurement vector (denoted by M) may be significantly smaller than the dimension of the signal (denoted by N), and thus, estimating the signal from the measurements, shown by a dashed arrow in equation 8, may be relatively difficult and may possibly yield inaccurate results. Therefore, if x is available or otherwise known, then computing z,$\tilde{z}$ may be relatively easy, as shown by following the solid, single line arrows in equation 8. However if only the measurement vector y is available, computing z may be relatively simple, but computing $\tilde{z}$ may be relatively difficult and inaccurate because it may require estimating the signal x from the measurements. Thus, a sensing matrix $\Phi$ may be defined as "shift-preserving", for the particular shift d, if it is possible to estimate $\tilde{z}$ from y in a relatively simple and accurate way, without requiring an estimation of the original signal x.

Equation 9 shows computational steps of estimating a translation feature vector from compressive measurements.

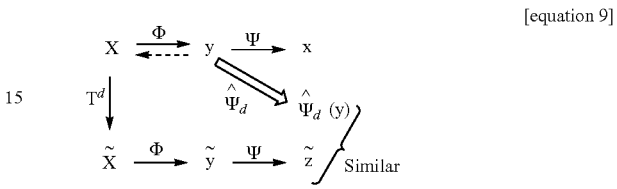

[equation 9]

In equation 9, $\hat{\Phi}_d(y)$ denotes an estimate of $\tilde{z}$ computed from y for the shift d, having a computational path as shown as a double arrow in equation 9. A sensing matrix may be shift-preserving for all possible shifts and/or for a specific set of shifts of interest.

In various embodiments, a shift-preserving sensing matrix may be derived from frequency domain transform, such as a Discrete Fourier Transform (DFT), which is defined by $$X(k) = \sum_{n=0}^{N-1} c_{k,n} x(n), \qquad \text{[equation 10]}$$

$$0 \le k < N$$

where $c_{k,n}$ are complex numbers defined by $$c_{k,n} = \exp(-2\pi i k n / N) \qquad \text{[equation 11]}$$

Here exp( ) is an inverse function of a natural logarithm (i.e. ln(exp(x))=x and i=$\sqrt{-1}$ is the imaginary unit). In matrix notation the DFT is given by equation 12:

$$X = Cx \qquad \text{[equation 12]}$$

In equation 12, C=[$c_{k,n}$], 0≤k,n<N X=[X(0), . . . , X(N−1)]$^T$ is the DFT of x.

Suppose that $\tilde{x}=T^d x$, where out-of-domain cases are defined by periodic extension, as in equation 2, and let $\tilde{X}=C\tilde{x}$ be the DFT of $\tilde{x}$. A well known property of the DFT is shown in equation 13

$$\tilde{X}(k) = \lambda_k^{-d} X(k), \ 0 \le k < N \qquad \text{[equation 13]}$$

where $\lambda_k = \exp(-2\pi i k / N)$ or in matrix notation $$\tilde{X} = CT^d x = \Lambda^d Cx = \Lambda^d X \qquad \text{[equation 14]}$$

where $\Lambda$ is represented by the matrix shown below:

$$\Lambda = \begin{bmatrix} \lambda_0 & 0 & \cdots & 0 \\ 0 & \lambda_1 & \cdots & 0 \\ \vdots & \vdots & \ddots & 0 \\ 0 & 0 & \cdots & \lambda_{N-1} \end{bmatrix}$$

Thus, a shift in the time domain is represented by scalar multiplications in the frequency domain, or more generally, by scalar operations on the transform coefficients. Other embodiments may use different transforms, such as a chirp Z-transform (often referred to a Bluestein fast Fourier transform (FFT) algorithm), or other like transforms where the number of transform coefficients is different and/or the values of the multipliers $\lambda_k$ are different, and/or the scalar operations on transform coefficients are not multiplication operations.

Referring to equations 3, 11 and 12 as shown above, $\Phi$ may be defined by $$\phi_{m,n} = c_{s(k),n} = \exp\left(\frac{-2\pi i s(k) n}{N}\right), \quad \text{[equation 14]}$$
$$0 \le m < M, 0 \le n < N$$

where $\{s(0), \ldots, s(M-1)\}$ is the measurement selection sequence, which is a subset of $\{0, \ldots, N-1\}$. Then the entries of a measurement vector $y=\Phi x$ are given by $$y(m) = X_{s(m)} = (Cx)_{s(m)} \quad \text{[equation 15]}$$

In this embodiment, the preferred feature extraction operator $\Psi$ is the unit matrix, and consequently the feature vector of the original measurement vector is the measurement vector itself. Then:

$$\tilde{z}(r) = (\Psi \Phi T^d x)_r = (CT^d x)_{s(r)} = (\Lambda^d X)_{s(r)} = \lambda_{s(r)}{}^d X(s(r)) = \lambda_{s(r)}{}^d z(r) \quad \text{[equation 16]}$$

Thus, a translation feature vector can be easily computed from the measurement vector by equation 16 below.

$$(\hat{\Psi}_d(y))_r = \lambda_{s(r)}{}^d y_r \quad \text{[equation 16]}$$

In other embodiments, a multi-dimensional frequency transform is applied to a multidimensional signal. Suppose the signal $x(h,v,t)$, $0 \le h < H$, $0 \le V < V$, $0 \le t < T$ is three-dimensional. The corresponding three-dimensional DFT which correspond to equations 10-13 is given by equations 17 and 18, shown below:

$$X(k_h, k_v, k_f) = \sum_{t=0}^{T-1}\sum_{v=0}^{V-1}\sum_{f=0}^{F} c(k_h, k_v, k_f; h, v, f) x(h, v, f) \quad \text{[equation 17]}$$
$$0 \le k_h < H, 0 \le k_v < V, 0 \le k_f < F$$

$$c(k_h, k_v, k_f; h, v, f) = \exp\left[-2\pi i\left(\frac{k_h h}{H} + \frac{k_v v}{V} + \frac{k_f f}{F}\right)\right] \quad \text{[equation 18]}$$

If x is serialized into a one-dimensional vector, the matrix notation of equation 13 is still valid, with C being a matrix whose elements are the coefficients $c(k_h,k_v,k_f;h,v,f)$ organized in an appropriate manner. If $d=(d_h,d_v,d_f)$ is a three dimension shift vector, then in the multidimensional case equation 13 gets the form as shown in equation 19 below:

$$\tilde{X}(k_h,k_v,k_f) = \lambda_{k_h}{}^{d_h} \mu_{k_v}{}^{d_v} \nu_{k_f}{}^{d_f} X(k_h,k_v,k_f),$$

$$\lambda_{k_h}{}^{d_h} = \exp(-2\pi i k_h/H), \mu_{k_v}{}^{d_v} = \exp(-2\pi i k_v/V), \nu_{k_f}{}^{d_f} = \exp(-2\pi i k_v/V) \quad \text{[equation 19]}$$

Additionally, the matrix notation of equation 14 remains valid, with the diagonal values of $\Lambda$ appropriately set to values of equation 20, shown below:

$$\lambda_{k_h}{}^{d_h} \mu_{k_v}{}^{d_v} \nu_{k_f}{}^{d_f}, 0 \le k_h < H, 0 \le k_v < V, 0 \le k_f < F \quad \text{[equation 20]}$$

Accordingly, the measurement vector definition of equation 15 becomes equation 21, shown below:

$$y(m) = X(s_h(m), s_v(m), s_f(m)) \quad \text{[equation 21]}$$

and the measurement selection sequence is also three-dimensional, $\{(s_h(0), s_v(0), s_f(0)), \ldots, (s_h(M-1), s_v(M-1), s_f(M-1))\}$. While the notation in the case of multi-dimensional frequency transform is more cumbersome, the method is essentially the same.

In some embodiments it is beneficial to randomize the signal prior to applying a frequency transform. For example, randomization may include randomly toggling the signs of the entries in the signal vector. $u=[u(0), \ldots, u(N-1)]^T$ be the randomized signal, defined by $u(n)=b(n)x(n)$, $b(n)=\pm 1$, $0 \le n < N$, where the values of $b(n)$ are selected randomly. As a result of the randomization, the signal $u$ is similar to white noise, with near-zero correlation among its entries. As a result of this, the definition of the sensing matrix in equation 14 becomes equation 22, shown below:

$$\phi_{m,n} = c_{s(k),n} b(n) = \exp\left(\frac{-2\pi i s(k) n}{N}\right) b(n), \quad \text{[equation 22]}$$
$$0 \le m < M, 0 \le n < N$$

Let $U=Cu$ be the DFT of the randomized signal vector, $u=[u(0), \ldots, u(N-1)]^T$. Modifying equation 15 to this case, the measurements are defined by equation 23, shown below:

$$y(m) = U(s(m)) = (CBx)_{s(m)} \quad \text{[equation 23]}$$

where B is a diagonal matrix whose diagonal entries are $b(0), \ldots, b(N-1)$. Let $w=[w(0), \ldots, w(N-1)]^T$ be defined by equation 24, shown below:

$$w(n) = u^2(n) = x^2(n) \quad \text{[equation 24]}$$

The feature vector corresponding to y is defined to be the DFT of w, $z=\Psi y=W=Cw$. Since the signal w is obtained from the original signal by the scalar non-linear operation of squaring, it maintains the correlation structure of the original signal and thus characterizes it. Furthermore, since the DFT is shift preserving, the feature vector z characterizes the spatio-temporal shape of the signal.

The feature vector of the original signal is estimated using the well known identity of equation 24, shown below:

$$W(k) = \frac{1}{N}\sum_{n=0}^{N-1} U(n) U(\langle k-n\rangle_N) \quad \text{[equation 24]}$$

where $\langle k-n\rangle_N$ denotes $(k-n)\mod(N)$, which is defined as the smallest non negative integer $l$ such that $k-n-l$ is divisible by N. The right hand side of equation 24 is an average of a population of random terms of the form $U(n)U(\langle k-n\rangle_N)$. Let $$D_k = \{m | 0 \le m < M \wedge \langle k-s(m)\rangle_N \in \{s(0), \ldots, s(M-1)\}\} \quad \text{[equation 25]}$$

By this definition, for any $m \in D_k$ there is some $\theta_d(m) \in D_k$ such that $s(\theta_d(m)) = \langle k-s(m)\rangle_N$. Therefore, if $n=s(m)$ for some $m \in D_k$ then $$U(n)U(\langle k-n\rangle_N) = y(m)y(\theta_d(m)), \quad \text{[equation 26]}$$

Thus in this case the term $U(n)U(\langle k-n\rangle_N)$ can be computed from measurements. Therefore, the set $\{y(m)y(\theta_d(m)) | m \in D_k\}$ is a known sample of the generally unknown population $\{U(n)U(\langle k-n\rangle_N)\}$. The mean of the unknown population may be estimated from the known sample using common statistical methods. In some embodiment, the mean of the known sample may be used as an estimate of the mean of the population. Various embodiments may apply a weighting factor to each estimate, based, for example, on the number of elements in each set $D_k$, in order to give greater weight to estimates which are based on larger same sets. In yet other embodiments may apply additional constraints, based on the signal properties, in the estimation process in order to make it more accurate. While the methods of estimation may vary in different embodiment, they all result in values $\hat{W}(k)$, $0 \leq k < N$ which are estimates of entries of the feature vector $W(k)$, given in equation 24.

Estimating the translation feature vector $\hat{\Psi}_d(y)$ is done in two steps: First, $\hat{W}(k)$ are estimated as explained above. Then, using equation 13, the estimated translation feature vector is obtained by equation 27, shown below:

$$(\hat{\Psi}_d(y))_k = \lambda_d^k \hat{W}(k) \qquad [\text{equation 27}]$$

Accordingly, in various embodiments, an estimated translation feature vector is computed by multiplying entries of an estimated feature vector of the original feature vector by an appropriate scaling factor. In yet other embodiments, other operations may be applied to the estimated feature vector of the original measurement vector in order to obtain an estimated translation feature vector.

As shown in operation S410, the motion detection device 105 divides the video data into a plurality of blocks. The method of the motion detection device 105 dividing the video data into video blocks is expounded upon in the flowchart shown in FIG. 11. The captured video data includes a sequence of segments, known as frames, where each frame includes a plurality of pixels. Each block may include pixels from one or more frames. In various embodiments, a block may include pixels belonging to a fixed spatial rectangle in several consecutive frames. Each block may span a specific spatial rectangle in two or more consecutive frames. In various embodiments, blocks may be disjointed or overlapping. In addition, the spatial shape of the block need not be a rectangle, and the spatial shape need not be the same shape in each of the consecutive frames spanned by the block.

As shown in operation S415, the motion detection device 105 multiplies pixels in each block by a spatial window function, which may be advantageous when generating compressive measurements for each block. However, it should be noted that multiplying pixels in each block by a spatial window is optional, and the method may be performed to generate compressive measurements without having to apply a spatial window to each block.

As explained above, when using a sensing matrix based on a frequency domain transform, the translation feature vectors are computed under the assumption that the signal is extended in a periodic manner. This may cause undesired discontinuities at the ends and/or boundaries of the signal domain interval where the signal wraps around. A well-known technique to reduce and/or eliminate the discontinuities is to multiply the signal by a window function. A window function may be applied to a signal in order to allow the signal to "taper" to a near zero (0) value at the ends and/or boundaries of the signal domain. Once a window function is applied to a signal, the discontinuities may be diminished and/or may disappear because the signal values at or near the ends and/or boundaries of the signal domain are at or near zero. In various embodiments, the window function may be two-dimensional when processing still images, and the application of the window function may cause the signal to taper to near zero at the image boundaries.

As shown in operation S420, the motion detection device 105 converts each block into a pixel vector having N pixel values, where N is the number of pixels in a block. For clarity of description it is assumed that a video signal may be black and white, and each pixel value may represent a level of luminance. In various embodiments, the video signal may be in color video, and at least some of the pixel values represent color and/or chrominance levels. The ordering of the pixels in the vector, which may be referred to as serialization, can be done in various ways. In some embodiments, serialization may be done by ordering rows, then ordering columns, and then ordering frames, as shown table 1.

TABLE 1

| 1D | 3D | | |
|---|---|---|---|
| Ser. | Row | Col. | Frm. |
| 0 | 0 | 0 | 0 |
| 1 | 1 | 0 | 0 |
| . | . | . | . |
| . | . | . | . |
| . | . | . | . |
| H − 1 | H − 1 | 0 | 0 |
| H | 0 | 1 | 0 |
| . | . | . | . |
| . | . | . | . |
| . | . | . | . |
| 2H − 1 | H − 1 | 1 | 0 |
| 2H | 0 | 2 | 0 |
| . | . | . | . |
| . | . | . | . |
| . | . | . | . |
| (k − 1)HV − 1 | H − 1 | V − 1 | k − 2 |
| (k − 1)HV | 1 | 0 | k − 1 |
| . | . | . | . |
| . | . | . | . |
| . | . | . | . |
| kHV − 1 | H − 1 | V − 1 | k |

In such embodiments, images include frames, which comprise pixels organized in rows and columns. The number of rows and columns are denoted by V and H, respectively. The one-dimensional (1D) indices in the right hand side of table 1 are serialized indices that correspond to the three-dimensional (3D) indices in the right hand side of table 1. With such an arrangement, a horizontal translation with a shift of one corresponds to translation of the pixel vector with a shift of one, a vertical translation with a shift of one corresponds to a translation of the pixel vector with a shift by H, and a temporal translation with a shift of one frame corresponds to a translation of the pixel vector with shift of HV. If horizontal and/or vertical translation are done in the pixel vector by translating in multiples of one of H, the edge of a row or a frame may end up overlapping the next row and/or frame, respectively. In order to avoid such overlapping, in various embodiments, the block may be extended by zeros in all directions prior to serialization.

As shown in operation S425, the motion detection device 105 multiplies each pixel vector by a shift-preserving sensing matrix to obtain a captured measurement vector. In other words, the motion detection device 105 generates measurements by applying the sensing matrix to the pixel vectors of the captured video data.

As shown in operation S430, the motion detection device 105 transmits the captured measurement vector to server 115 for processing. Once the motion detection device 105 transmits the captured measurement vector to server 115 for processing, the motion detection device 105 proceeds back to operation S405 to capture video data having consecutive frames.

Figure 5:
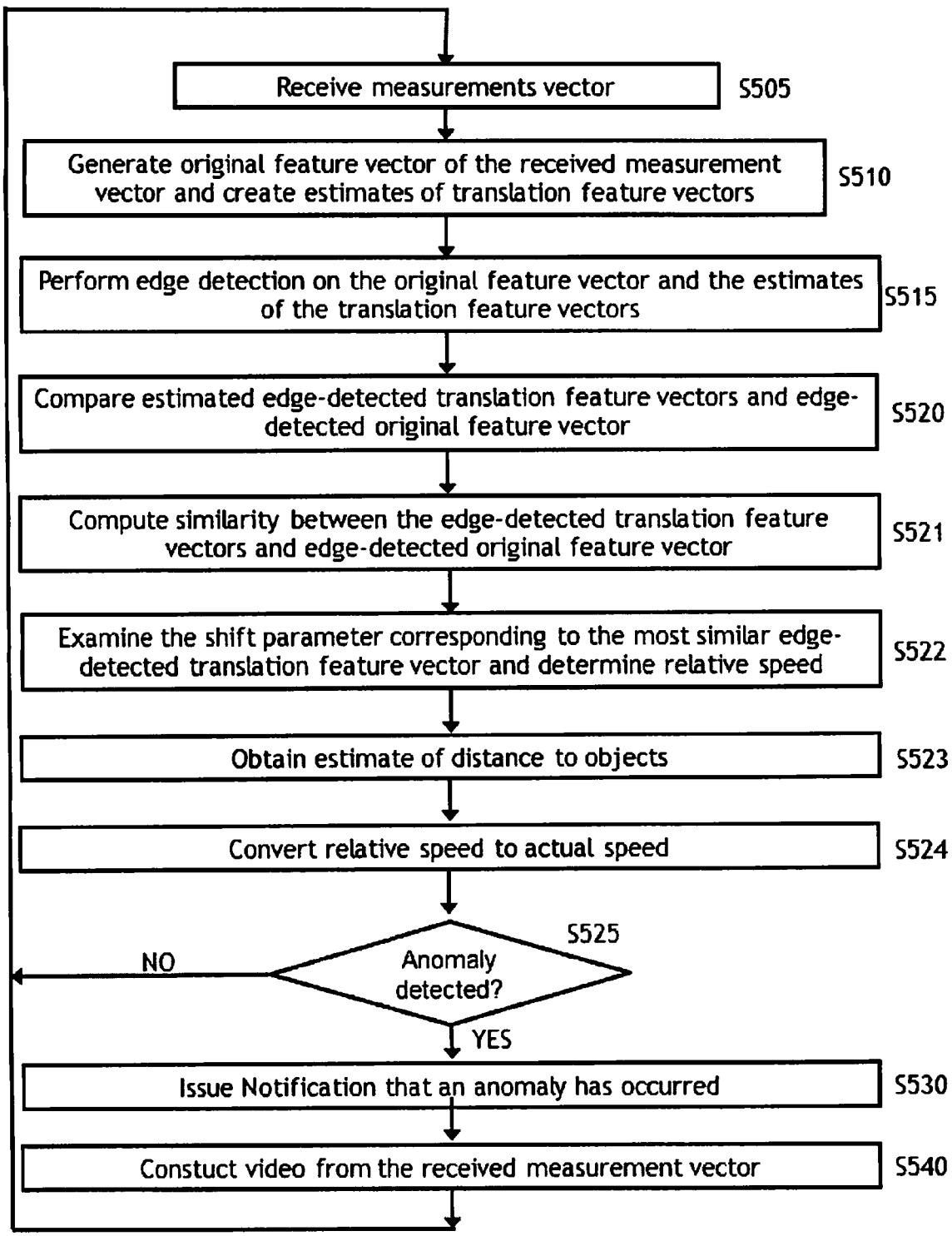
FIG. 5 shows an anomaly detection routine, in accordance with an example embodiment.

FIG. 5 shows an anomaly detection routine 500, according to an example embodiment. Anomaly detection routine 500 may be used to detect anomalies in a set of video data, which has been captured and compressed and/or encoded using compressive sensing with a shift-preserving sensing matrix. For illustrative purposes, the operations of compressive measurement anomaly detection routine 500 will be described as being performed by the server 115 as described above with respect to FIG. 3. However, it should be noted that other similar network elements may operate the anomaly detection routine 500 as described below.

Referring to FIG. 5, as shown in operation S505, the server 115 receives the measurement vector, which was generated by the motion detection device 105 as discussed above with respect to FIG. 4.

As shown in operation S510, the server 115 generates an original feature vector, $\Psi(y)$, of the received measurement vector and generates estimates of translation feature vectors $\hat{\Psi}_d(y)$, where the values of d correspond to shifts corresponding to possible motions. In addition the server may generate estimates of translation vectors $\hat{\Psi}_{d+e(p)}(y)$, $\hat{\Psi}_{e(p)}(y)$, $0 \le p < P$ where $e(p)$, $0 \le p < P$ are shift values corresponding neighboring pixels which are to be used in edge detection operation.

An effect of translation on blocks which contain and do not contain motion is described as follows. For example, consider a block that includes an object. If the block spans five (5) frames with an additional all zeros frame appended at the end, a spatial rectangle of the block, which is V rows by H columns, contains the object when the object is stationary. The same block after a temporal (e.g., a circular shift) translation by one frame may be similar to the original block.

Now suppose that the object in the block is moving. The temporally translated block will no longer be similar to the original block because the position of the object changes from frame to frame due to the motion of the object. However, if the block is translated both temporally and spatially, the object in each translated frame can be aligned with the object in the original frame, and thus, a translated block that is very similar to the original block may be obtained. This similarity may be achieved by selecting a translation with specific horizontal and vertical shifts, which correspond to the horizontal and vertical components of the velocity of the moving object. Therefore, if the pixel vector is given, we can detect motion by finding a shift d which minimizes the distance $\|T^d x - x\|$, where $\|\cdot\|$ is a suitable norm, (e.g. the root-mean-square distance, also known as the $L^2$ norm). Once the shift is found, it can be converted into three-dimensional (3D) indices. The 3D indices may be used to find a ratio of the horizontal and vertical shift components to the temporal shift component. The ratio may be used to determine the horizontal and vertical velocity component of the object in the block. Note that the minimization need not be over all possible shifts but only over the shifts of interest, that is shift which corresponds to a spatio-temporal translation which can be realistically expected in the scene.

One characteristic of sensing matrices is that they may approximately preserve norms of sparse vectors, that is if x is sparse and $y = \Phi x$ then the ratio $\|y\|:\|x\|$ is close to one (1). Therefore, the distance may be represented by equation 28.

$$\|\Phi T^d x - y\| = \|\Phi(T^d x - x)\| \approx \|T^d x - x\| \qquad \text{[equation 28]}$$

Since x and $T^d x$ may not be available at the server, instead of minimizing $\|T^d x - x\|$ we can minimize the distance between the translation measurement vectors $\Phi T^d x$ and the original measurement vector $\Phi x = y$. This, however, also cannot be computed directly, because while y is known, the translation measurement vectors $\Phi T^d x$ may not be available.

Suppose that a similarity measure between feature vectors, $\sigma(z, \tilde{z})$, such that if $z = \Psi(y)$, $\tilde{z} = \Psi(\tilde{y})$ and $\sigma(z, \tilde{z})$ is relatively small. That is, z and $\tilde{z}$ are similar, then with high probability $\|y - \tilde{y}\|$ is also small. Since $\Phi$ is a shift-preserving matrix, $$\sigma(\hat{\Psi}_d(y), \Psi(y)) \approx \sigma(\Psi(T^d y), \Psi(y)) \qquad \text{[equation 29]}$$

A low value of $\sigma(\hat{\Psi}_d(y), \Psi(y))$ indicates that $\|\Phi T^d x - y\|$ $\|T^d x - x\|$ may be small too. Therefore, minimizing $\sigma(\hat{\Psi}_d(y), \Psi(y))$ over all shift values of interest gives us an estimate of the shift value which minimizes $\|\Phi T^d x - y\|$, and thus provides an estimate of the velocity of the objects in the block.

The above analysis relies on the signal being sparse signal. However, real-life image and video signals may include non-sparse signals. Thus, in some embodiments, edge detection may be used to sparsify the signal. Edge detection may include any mathematical method that identifies points in image data where a brightness of an image changes sharply or has discontinuities. A common way to perform edge detection is by subtracting from each pixel an average of its neighboring pixels. As a result, pixels that are inside a region of uniform or slowly changing luminosity tend to vanish and the only pixels which have high non-zero values are the pixel at the boundary between regions or objects. For example, after edge detection, the five (5) block frames, as discussed above, would be all zero except for a thin solid line marking the boundary between the object and the background. As a result, performing edge detection makes the signal including the object sparse. When considering pixel vectors, let x(n) be a pixel and let x(n−e(p)), $0 \le p < P$ be its neighboring pixels, that is, pixels in the same frame which are spatially adjacent or very close to x(n). The edge detected signal may be defined by subtracting from each pixel the average of its neighbors, as shown in equation 30:

$$x_e(n) = x(n) - P^{-1} \sum_{p=0}^{P-1} x(n + e(p)) \qquad \text{[equation 30]}$$

The edge detected signal may also be defined using translation notation, as shown in equation 31:

$$x_e = x - P^{-1} \sum_{p=0}^{P-1} T^{e(p)} x \qquad \text{[equation 31]}$$

The edge detected signal preserves the position of the objects in each frames in the form of their silhouettes, thus, performing edge detection on a signal is preferable in various embodiments. Next, a shift d which minimizes $\|T^d x_e - x_e\|$ over all shifts of interest is determined. Since $\Phi$ is a sensing matrix and the signal $x_e$ is sparse, the shift can be approximated by minimizing $\|\Phi T^d x_e - \Phi x_e\|$, which is further approximated by the minimization of $\sigma(\Psi(\Phi T^d x_e), \Psi(\Phi x_e))$, which, by the linearity of $\Psi$ gets the form of equation 32:

$$\sigma(\Psi(\Phi T^d x_e), \Psi(\Phi x_e)) = \sigma\left(\Psi(\Phi T^d x) - P^{-1} \sum_{p=0}^{P-1} \Psi(\Phi T^{d+e(p)} x),\right.$$
$$\left.\Psi(y) - P^{-1} \sum_{p=0}^{P-1} \Psi(\Phi T^{e(p)} x)\right) \approx \qquad \text{[equation 32]}$$

-continued $$\sigma\left(\hat{\Psi}_d(y) - P^{-1}\sum_{p=0}^{P-1}\hat{\Psi}_{d+e(p)}(y), \Psi(y) - P^{-1}\sum_{p=0}^{P-1}\hat{\Psi}_{e(p)}(y)\right)$$

The result of incorporating edge detection into the calculation is that instead of computing the similarity between an feature vector Ψ(y) and an estimate of a translation feature vector, $\hat{\Psi}_d(y)$, the similarity between two corresponding linear combinations of estimated translation feature vectors, $\Psi(y) - P^{-1}\Sigma_{p=0}^{P-1}\hat{\Psi}_{e(p)}(y)$ and $\hat{\Psi}(y) - P^{-1}\Sigma_{p=0}^{P-1}\hat{\Psi}_{d+e(p)}(y)$ may be computed. Note that in this case, the shifts values of interest are the shifts d which correspond to possible translations as well as the shifts of the form d+e(p), 0≤p<P−1

As shown in operation S515, the server 115 performs edge detection. In various embodiments, edge detection may be performed as shown in equations 19 and 20, as discussed above. The results of the operation are edge-detected translation feature vectors, which are linear combinations of the original feature vector and the estimates of the translation feature vectors. However, it should be noted that performing edge detection on the original feature vector is optional, and the method may be performed to detect anomalies without having to perform edge detection.

Referring back to FIG. 5, as shown in operation S520, the server 115 compares the estimated edge-detected translation feature vectors with the edge-detected original feature vector.

In operation 521, the similarity σ(z,ẑ) between the edge-detected translation feature vectors and the edge detected original feature vector (or, if edge detection has not been performed, the similarity σ(z,ẑ) between the translation feature vectors and the original feature vector) is computed. The similarity values are compared and an edge detected translation feature vector which is most similar to the edge detected original feature vector is selected.

In operation 522, the shift parameter d corresponding to the most similar edge detected translation feature vector is examined to determine the relative speed and direction of motion in the block. In addition, the level of similarity σ(z,ẑ) is examined to determine a measure for the certainty of the estimated speed and direction. The term "relative speed" indicates that the determined speed is in the video image plane, and is measured in pixels per time unit. In order to convert the relative speed into an actual speed of an objects one must know the distance of the object from the camera.

It should also be noted that example embodiments are not limited to comparing the entire original feature vector with an entire one or more translation feature vectors. In various embodiments, the comparison may include comparing one or more elements of one or more sets of the original feature vector with one or more elements of the set of first feature vectors. Additionally, in some embodiments, where multiple original feature vectors are generated, a degree of similarity may be determined between one or more elements of each generated original feature vectors.

Figure 7:
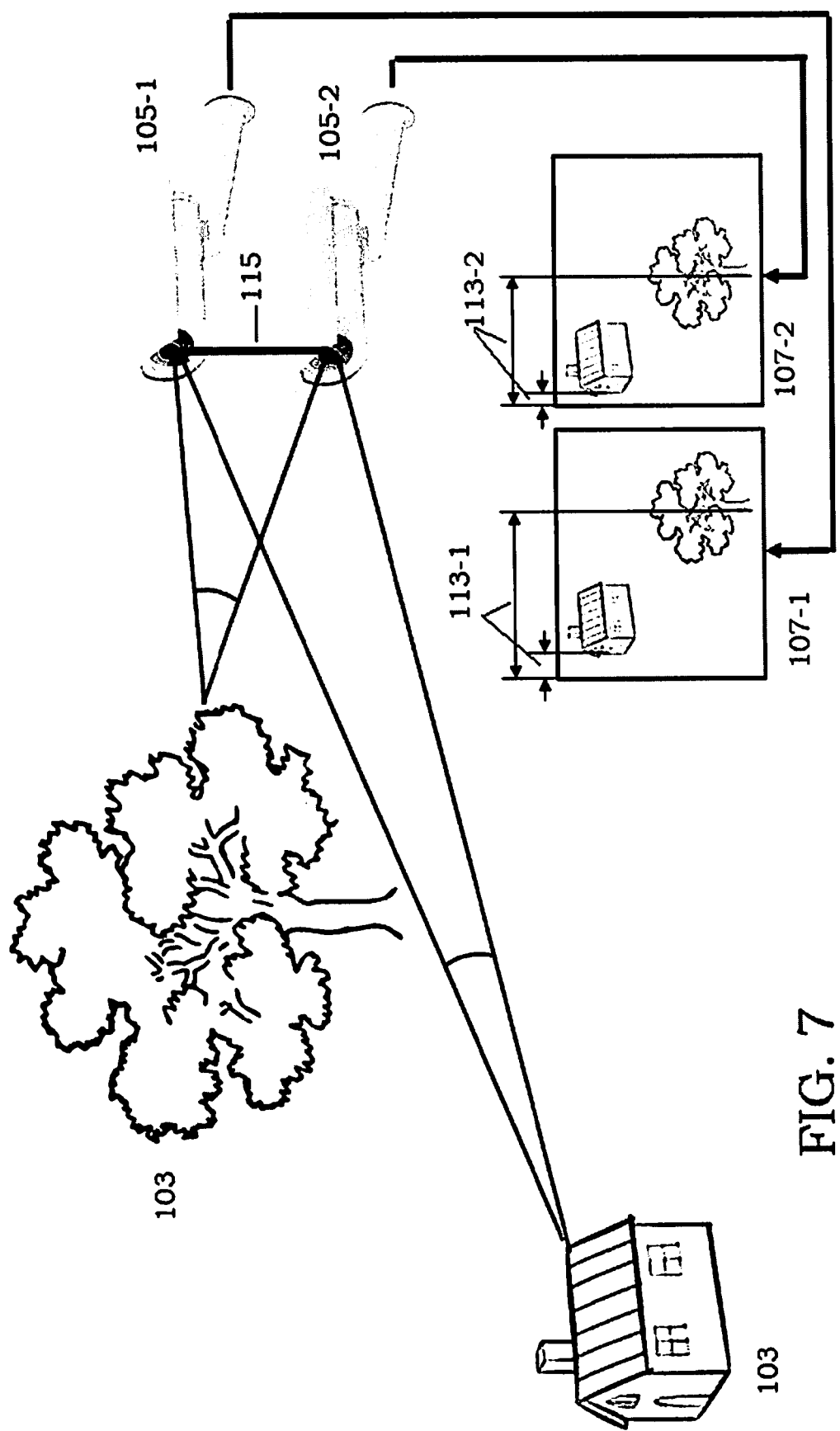
FIG. 7 is a diagram of multiple motion detection devices being utilized to determine video block sizes, in accordance with an example embodiment.
Figure 8:
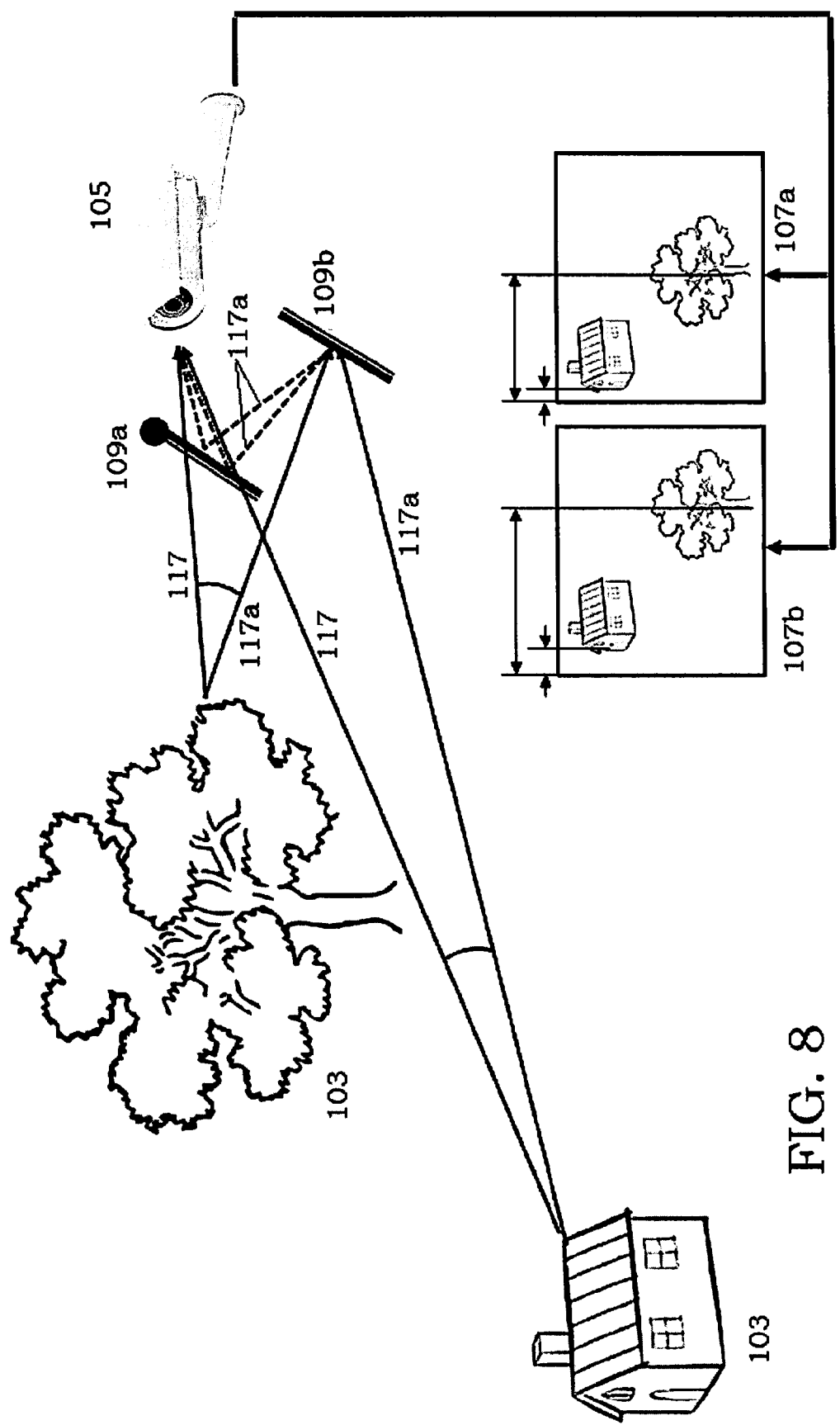
FIG. 8 is a diagram of a single motion detection device being utilized to determine video block sizes, in accordance with an example embodiment.
Figure 9:
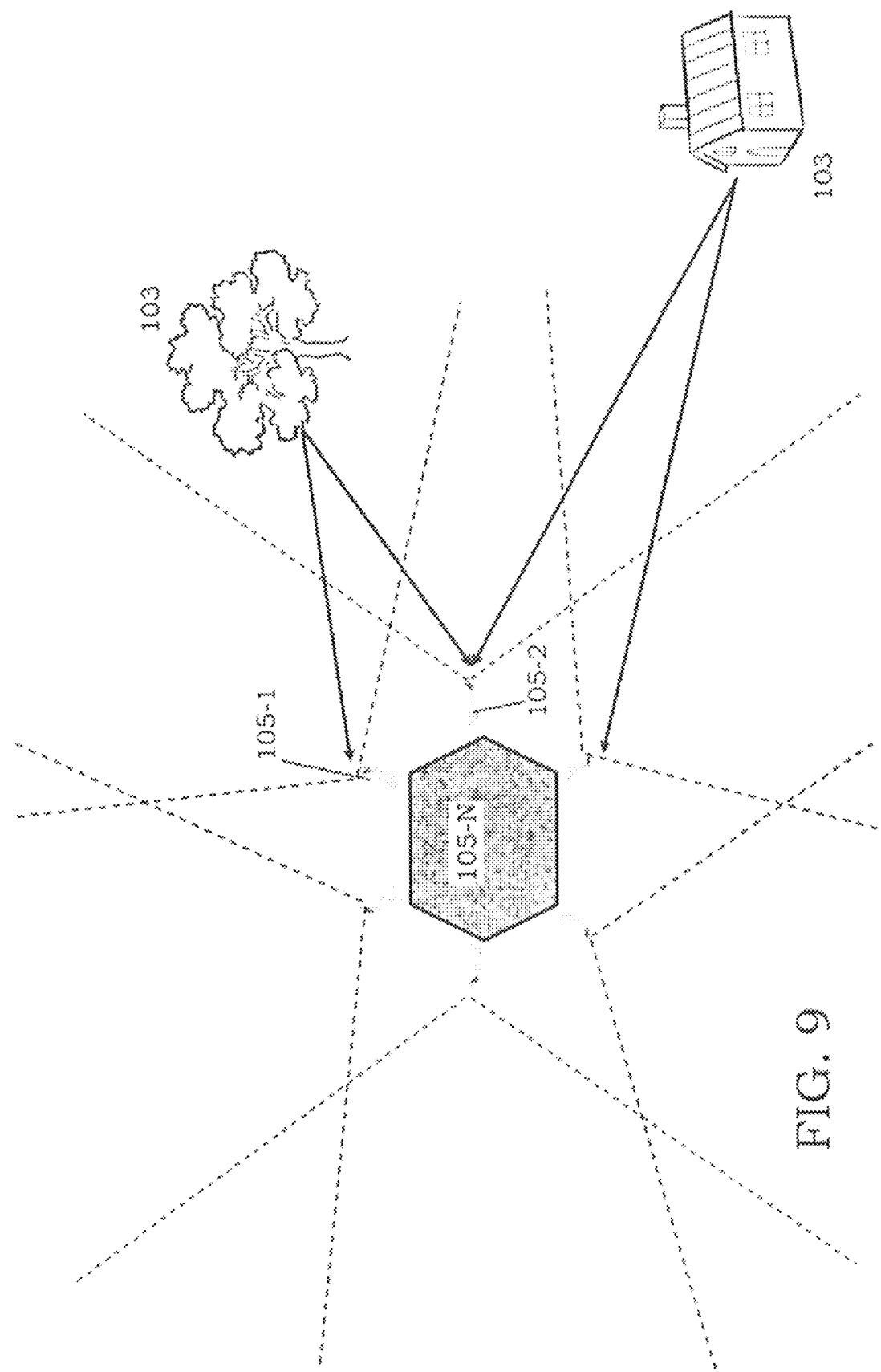
FIG. 9 is a diagram of a system of motion detection devices being utilized to determine video block sizes, in accordance with an example embodiment.

In operation S523 the server 115 obtains an estimate of the distance between the capturing device and the objects captured in the block. Typically this distance is an average or representative distance of the distances to each of the objects in the blocks. Different embodiments use different ways to obtain this estimated distance. In some embodiments the distance is estimated by the capturing device 105, as explained in the discussion of FIGS. 6-9, and that distance is transmitted to the server 115. In other embodiments, the capturing device 105 sets the block size based on the distance, as explained in FIG. 11, operation S606, and the server 115 computes the estimated distance based on the block size. In other embodiments the server computes an estimate of the distance using the measurements received from several capturing devices, or from a single capturing device in different positions, as shown in FIGS. 7-9. In such cases the server 115 estimates the distance in essentially the same way that the capturing device estimates it, as explained in the discussions of FIGS. 7-9. It should be understood that the above discussion only includes examples for the server 115 to obtain distance information, though any other method of obtaining this information would also be appropriate.

Using the estimated distance, the relative speed computed in operation S522 is converted to actual speed in operation S524. For example, if the angular spacing between pixels is ρ radians and the distance is d meters, then a relative motion of w pixels per second is converted to an actual speed of v=ρwd meters/sec.

As shown in operation S525, the server 115 determines if an anomaly is detected. Anomaly detection is based on an estimated speed and/or direction of objects in a given block. If the actual speed and/or direction are outside a desired "normal" range, an anomaly may be declared or otherwise determined to exist. The "normal" range may be different from block to block. The "normal" range may vary according to a position of the block. In addition, the decision about anomaly may be modified based on the certainty of the estimated speed and/or direction. For example, if the estimated speed and/or direction are outside the normal range but within a desired margin, and the certainty of the estimation is low, an anomaly may not be declared because of the possibility that the actual speed and/or direction are within the normal range. On the other hand, a very low certainty determination may indicate that there are some changes in the block, but they cannot be described as a uniform motion. In that case, an anomaly may be declared even if the estimated speed and/or direction are within the normal range. As discussed above, an amount of difference between the original feature vector and the one or more translation feature vectors, or a desired degree of similarity, may represent an anomaly in a source signal and/or video data. The anomaly may be determined to be a motion, or a movement in a body or object, if the anomaly includes a desired degree of similarity and/or if the anomaly includes a direction. For instance, if an anomaly is detected, but includes a relatively high degree of similarity, then the anomaly maybe determined to not be a motion. Conversely, if an anomaly is detected that includes a relatively low degree of similarity then the anomaly maybe determined to be a motion. In this way, the degree of similarity may be used to determine a certainty of a detected motion. Additionally, as stated above, what constitutes a relatively high degree of similarity or a relatively low degree of similarity may be any desired amount or threshold. The determination of motion may be based on the translation parameters associated with the feature vectors or the elements of the feature vectors determined to be similar to each other, and/or a degree of similarity of the feature vectors or the elements of the feature vectors determined to be similar to each other. It should be noted that the ranges, margins, and/or other like parameters, as discussed above, may be determined based on empirical studies and/or other like analyses.

If the server 115 does not detect an anomaly in operation S525, the server 115 proceeds back to operation S505 to receive another measurement vector. Otherwise, if the server 115 detects an anomaly in operation S525, the server 115 proceeds to operation S530 to issue a notification that an anomaly has occurred. The notification may include information about the determined direction and/or speed. According to various embodiments, a notification may be issued to an operator who may take appropriate actions.

In various embodiments, issuing a notification or "flagging" a source signal or video stream may involve sending a message to one or more client devices (e.g., client devices 120A-B) of a surveillance system. Additionally, issuing the notification or flag may involve generating or otherwise defining a database record or other like file that contains information regarding a determined motion for a stream meeting and/or exceeding the desired threshold.

As shown in operation S540, the server 115 constructs video from the received measurement vector. Once the client devices are issued a notification or otherwise alerted of a source signal or video stream that includes a determined motion meeting and/or exceeding the desired threshold, operators associated with the one or more client devices may wish to review the video in order to observe the detected motion. Thus, in various embodiments, the compressed and/or encoded video may be constructed from the received measurement vectors and/or the feature vectors. However, it should be noted that reconstructing the video is optional, and the method may be performed without having to construct and/or reconstruct the video.

Once the server 115 constructs video from the received measurement vector in operation S540, the server 115 proceeds back to operation S505 to receive another measurement vector. In such embodiments where the video is not reconstructed, the server 115 may proceed back to operation S505 to receive another measurement vector after a notification is issued in operation S535.

As will be appreciated, the example embodiments as described above provide several advantages. First, example embodiments allow anomalies to be detected in video data without involving a human operator. Second, example embodiments allow anomalies to be detected in video data without requiring an excessive amount of computational and/or network resources. Third, example embodiments provide methods and systems for detecting anomalies in compressed video data without constructing and/or reconstructing the compressed video data.

Figure 6:
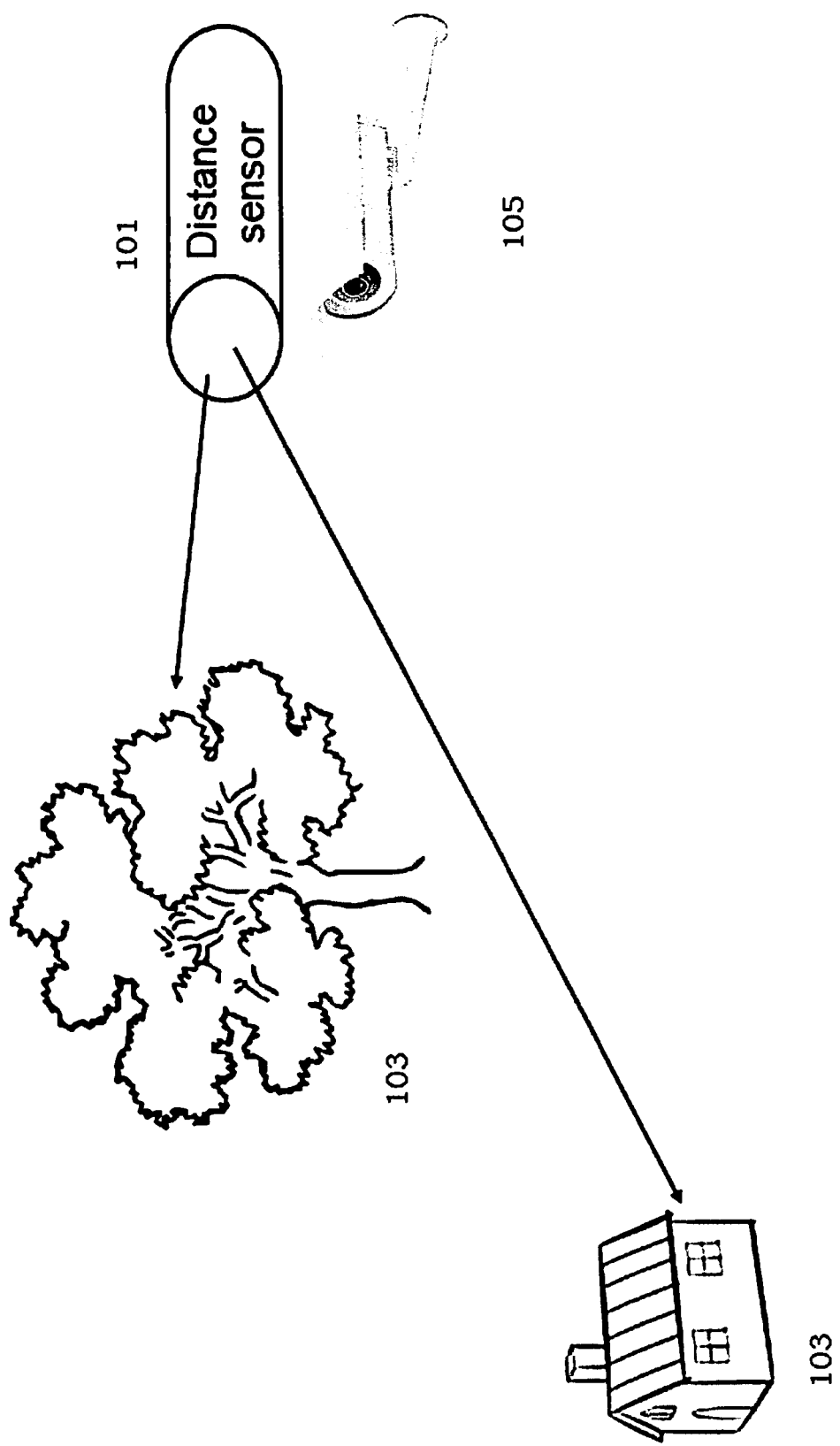
FIG. 6 is a diagram of a motion detection device and a distance sensor being utilized to determine video block sizes, in accordance with an example embodiment.

FIG. 6 is a diagram of a motion detection device 105 and a distance sensor 101 being utilized to determine video block sizes, in accordance with an example embodiment. In particular, the motion detection device 105 and the distance sensor 101 may be used in conjunction with each other (or, they may be the same component), such that the distance sensor 101 may be used to determine a physical distance between the motion detection device 105 and objects 103 that are being captured by the motion detection device 105. This distance information may be combined with captured images of the objects 103, and saved to memory 255, so that the compressive measurement generation routine 400 (controlled by processor 210) may determine video block sizes that are used in step S410 described above (see the method of determining the block sizes, discussed in detail in conjunction with FIG. 11, below).

It should be noted that the distance sensor 101 may be a laser sensor, an ultrasonic sensor, an ultrasound sensor, an infrared sensor, an ultraviolet sensor, or any other appropriate type of sensor that may transmit a signal and use a reflected signal to measure a physical distance to provide distance information for objects 103 that are being viewed by the motion detection device 105.

FIG. 7 is a diagram of multiple motion detection devices 105-1/105-2 being utilized to determine video block sizes, in accordance with an example embodiment. This configuration of multiple motion detection devices 105-1/105-2 may be used as an alternative to the FIG. 6 configuration, or it may be used in conjunction with the FIG. 6 configuration. In this configuration, two or more motion detection devices 105-1/105-2 may be used to capture images 107-1/107-2 of the same general scenery and similar objects 103. Based on the captured image information 107-1/107-2, and knowing a distance 115 between the motion detection devices 105-1/105-2 positioned at somewhat different vantage points, the compressive measurement generation routine 400 may compare relative distances 113-1/113-2 of common objects 103 within the captured images 107-1/107-2 in order to indirectly measure distances between the motion detection devices 105-1/105-2 and the objects. Specifically, well-known stereoscopic methods may be employed to compare the relative distances 113-1/113-2 of common objects 103 within images 107-1/107-2 to determine this distance information from the objects 103 to the motion detection devices 105-1/105-2. These stereoscopic methods do not require reconstruction of a viewable image 107-1/107-2, per se, as these measurements 113-1/113-2 may be collected, where a same sensing matrix is used for both cameras, and the sensing matrix may be "shift preserving" (i.e., shifts in the image may be determined by examining the measurement vector). Pairs of measurement vectors of a same video block in different cameras may be compared to determine the "shift" (indicated by the differences in measurements 113-1 and 113-2), and based on this "shift," the distance between the cameras 115, and the angle at which the objects 103 are seen, a distance to the object 103 may be computed.

A variant of FIG. 7 may also be accomplished through the use of a single camera that pans, such that the single panning camera may capture the two separate images 107-1/107-2 by being at different vantage points (through the panning motion). In effect, this variant may emulate the two camera 105-1/105-2 configuration.

Similar to FIG. 6, this distance information may be combined with the captured images 107-1/107-2 of the objects 103, and saved to memory 255, so that the compressive measurement generation routine 400 (controlled by processor 210) may determine video block sizes that are used in step S410 described above (see the method of determining the block sizes, discussed in detail in conjunction with FIG. 11, below).

FIG. 8 is a diagram of a single motion detection device 105 being utilized to determine video block sizes, in accordance with an example embodiment. This configuration makes use of mirrors 109a/b in order to determine distance information. In particular, the motion detection device 105 may capture an image 107a of objects 103 using a direct line of sight 117 from the motion detection device 105 to the objects 103. Therefore, image 107a represents a captured image without the use of mirrors 109a/b. The motion detection device 105 may also capture an indirect image 107b using an indirect line of sight 117a obtained through the use of the mirrors 109a/b. In particular, a movable mirror 109a may be employed to stand in front of the direct line of sight 117 of motion detection device 105, such that when the movable mirror 109a is placed in front of the motion detection device 105, the motion detection device 105 sees an image 107b that is reflected off of fixed mirror 109b. Through well-known stereoscopic methods (as described in FIG. 7), distance information between the motion detection device 105 and objects 103 may be discerned. Similar to FIGS. 6-7, this distance information may be combined with the captured image 107a (the direct image, obtained without the use of mirrors 109*a/b*), and saved to memory 255, so that the compressive measurement generation routine 400 (controlled by processor 210) may determine video block sizes that are used in step S410 described above (see the method of determining the block sizes, discussed in detail in conjunction with FIG. 11, below).

FIG. 9 is a diagram of a system of motion detection devices 105-N being utilized to determine video block sizes, in accordance with an example embodiment. Similar to FIG. 7, each subset of motion detection devices 105-N capable of capturing a same object 103 (such as motion detection devices 105-1/105-2 that share a partially-common field of view) may be used in conjunction with each other to determine distance information to the objects 103. However, in this configuration a well-known triangulation method may be employed to determine distance information, rather than using a stereoscopic method (which is used when the vantage point of cameras are parallel to each other). Similar to FIGS. 6-8, this distance information may be combined with the captured image 107*a*, and saved to memory 255, so that the compressive measurement generation routine 400 (controlled by processor 210) may determine video block sizes that are used in step S410 described above (see the method of determining the block sizes, discussed in detail in conjunction with FIG. 11, below).

Contrary to the configurations of FIGS. 6-9, distance information may also be determined by using some source of prior knowledge (such as a digital map) to determine distance information for the motion detection device 105.

Figure 10:
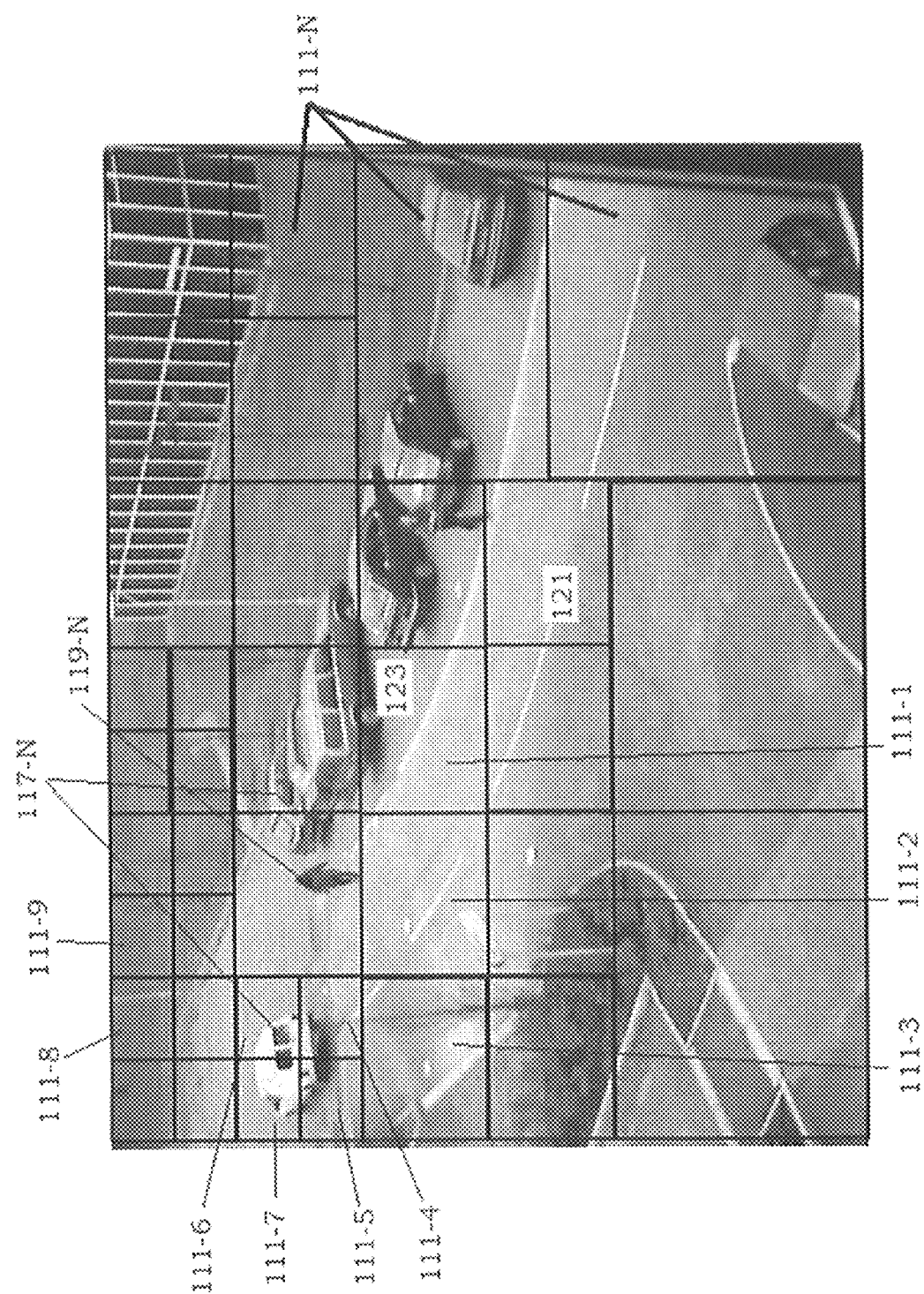
FIG. 10 is a diagram of varying block sizes of a captured image, in accordance with an example embodiment.

FIG. 10 is a diagram of varying block sizes 111-N of a captured image, in accordance with an example embodiment. While these blocks are shown to be non-overlapping in FIG. 10, it should be understood that these blocks may also be implemented such that they overlap with each other, Furthermore these blocks may have non-rectangular shapes. Features are to be extracted from these blocks for the purpose of anomaly detection (as described in detail above). An anomaly may be identified if the feature vector of a block is outside of an "allowed region" within the feature space. For instance, the feature vector may include motion information (speed and direction or a moving person, car, or other object), which represents the motion of objects in a block. If the video in the block corresponds to a section of a road (as is shown in FIG. 10), then the "allowed region" in the feature space may correspond to normal and expected speeds and directions of vehicles that are compatible with traffic laws of the particular road, the current state of the traffic lights, road congestion level, etc. Alternatively, the "allowed region" may be determined statistically, by observing a distribution of feature vectors during known normal conditions.

Because these features and anomalies are tracked on a block-by-block basis, where each block is encoded using compressive sensing to produce a measurement vector for anomaly detection analysis without decoding the video into pixels (as described above), the detection of features and anomalies may be assisted by varying the block sizes. For this purpose, block sizes should be chosen to be commensurate with the size of objects which one desires to monitor. If the block size is too large, many independent objects and extraneous information may make measurements ambiguous, and may mask the objects of interest. For example, if the object of interest is a car on the road, a block which is too large may contain many lanes of the road, and potentially contain several cars, such that any motion information extracted from the block becomes a meaningless combination of motion information related to several cars, as opposed to one particular car. Contrarily, if the block is too small, the feature extracted from the block may be a small object that is not of interest, such as a squirrel or a bird. In such a case, motion information for these objects that are not of interest may cause an incorrect identification of an anomaly.

Additionally, because a video scene generally has depth, the size of objects in the video image depend on a distance from the object to the camera. Objects of a same general size will occupy a small region of the video scene if the objects are distant, and the objects will occupy a large region of the video scene if the objects are near. For this reason, an optimal block size may be determined, in different regions of the overall video image, to capture objects of interest, depending on the anticipated size of the object and the distance from the object to the camera. In particular, smaller blocks may be implemented for scenery located further from the motion detection device, and larger blocks may be implemented for scenery located closer to the motion detection device. The distance information and associated block sizes may either be determined once and kept unchanged, or the distance information and associated block sizes may be continuously updated, as may be necessary if the capturing device 105 is moving, for example, during panning.

When distances are measured in advance, they are typically distance to the background, that is, to stationary objects such as roads, buildings, trees, fences, etc. When a moving object enters the scene, it may occlude some of the background. Then distance to the moving object may be considerably smaller than the distances to the background objects which it occludes. In some embodiments, in such event the size of the blocks is dynamically adapted in response to the change in distances. Furthermore, in some embodiments the future location of the object is predicted based on its estimated motion and block sizes are adapted based on such prediction.

Furthermore, distance information may also be obtained for moving objects that move through the blocks 111-N of FIG. 10. This distance may be measured using the configurations shown in FIGS. 6-9. Or alternatively, distance information of moving objects may be estimated based on the distance to the background that is located behind the moving object. Through the analysis of video, motion estimation of a moving object may determine a relative speed of the image of an object in the plane of the video frames, which is typically expressed in terms of the number of pixels that the image of the moving object traverses in a unit of time (i.e., pixels per unit of time). However, an anomaly is typically defined in terms of the motion of actual objects in the observed field, for example a car moving at speeds outside a certain range may be defined as an anomaly. By knowing the distance from the camera to the moving object, the anomaly specifications, defined in terms of the motion of an actual object, may be converted to anomaly specifications defined in terms of motion of an image of an object in the video frame plane, thus enabling detection of an anomaly based on estimation of motion in the video frame plane. By dividing an overall video image into varying blocks (as shown in FIG. 10), selective reconstruction of the original image may also be accomplished. In some applications, there is an interest in reconstructing only a selected region of a video or an image. If the video has been encoded in blocks of compressive measurements, the smallest regions can be selectively reconstructed as a single block. Thus, the block sizes can be small enough to allow a required level of zooming. But, the block sizes should not be too small because, as the blocks get smaller, an effectiveness of compression sensing decreases. Therefore, a desired size of the block may depend on the size of the object that may be seen in a region of the video or image. For this additional reason, adjusting block sizes based on distance information is a way to select appropriate block sizes which are optimal for selective reconstruction.

As additional discussion of FIG. 10 can be found in conjunction with the discussion of FIG. 11, below.

Figure 11:
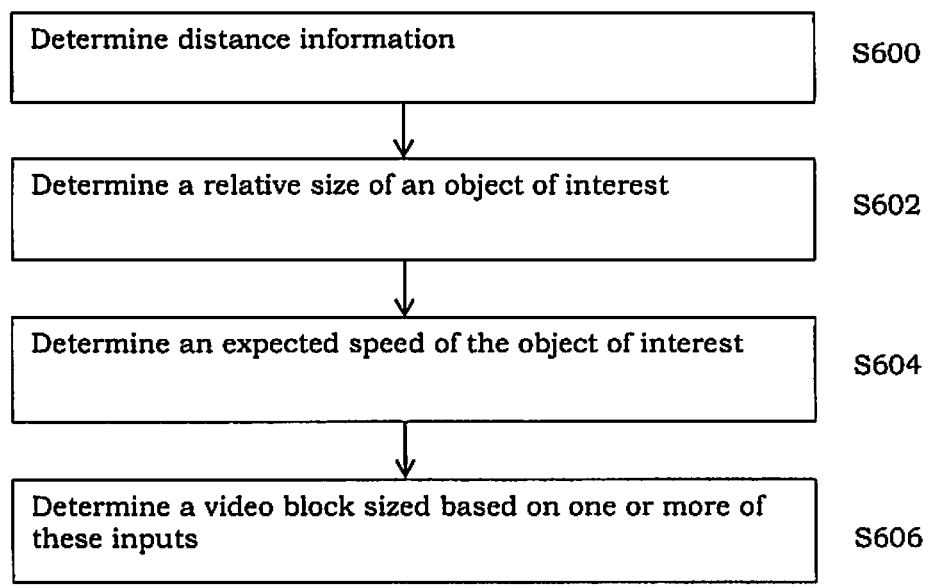
FIG. 11 is a flowchart of a method of dividing video data into block sizes, in accordance with an example embodiment.

FIG. 11 is a flowchart of a method of dividing video data into block sizes, in accordance with an example embodiment. This method may be performed at the motion detection device 105 that is controlled by processor 210.

In step S600, for a particular portion of the video data (such as the video image of FIG. 10), distance information may be determined. This distance information may be a distance between an object of interest (or a background objection, which may alternatively be considered an "object of interest" for purpose of this application) 117-N in the video image and the motion detection device 105 used to capture the image of FIG. 10 (where the motion detection device 105 may include any of the motion detection devices 105 shown in the configurations of FIG. 6-9). The distance information may be determined by any of the configurations shown in FIGS. 6-9 (described above).

In some embodiments, the capturing device 105 may send the distance information to the server 115, along with the measurements, in order to enable the server to convert relative speed into actual speed, as explained in steps S523-S524 of FIG. 5.

In step S602, a relative size of the object of interest 117-N may also be determined. For instance, in viewing the video image of FIG. 10, the upper-left quadrant of the image may be selected for analysis using the method of FIG. 11. Within this upper-left quadrant, there exists a portion of a road 121 existing in front of a small parking lot 123. Therefore, potential objects traversing the upper-left quadrant may include vehicles 117-N and people 119-N. Knowing this, it may be presumed for purposes of the method of FIG. 11 that vehicles 117-N are the object of interest, such that movement of people 119-N is not of interest. Consequently, the actual size of an object of interest is the average size of a car. The relative size of an object of interest, which is the length of the image of a car, in pixels in this portion of the video data, is computed using the distance information.

In step S604, an expected speed of the object of interest (vehicles 117-N) may also be determined. Because the road 121 exists in front a building in an office park, it may be presumed for purposes of this method that the posted speed limit sign is 15 mph. Therefore, a "normal" speed of the vehicles 117-N may be in a range from 0 to 15 mph. However, for purposes of this method, we may presume that the surveillance video of FIG. 10 is to be used, in part, to identify speeding vehicles which could reach potential speeds as great as 50 mph. Therefore, an expected speed of vehicles 117-N of interest could be in the range of 0 to 50 mph (and, this may be considered "speed information").

In step S606, a video block size or sizes 111-N may be determined for the upper-left quadrant of the image of FIG. 10 in order to monitor vehicles 117-N that are driven in such a way that an "anomaly" may be detected. To this end, bigger block sizes 111-1, 111-2, and 111-3 may be chosen for portions of the upper-left quadrant of FIG. 10 that are toward the bottom of the quadrant. These bigger block sizes 111-1, 111-2, and 111-3 may be sized in order to identify "anomalies" in the road 121 or parking lot 123 that may include a vehicle 117-N moving at a speed that is greater than 15 mph.

Because the road 121 tapers and trails off near the upper-left-most portion of FIG. 10, block sizes 111-4, 111-5, 111-6 and 111-7 may purposefully be made smaller, in the upper-left-most portion of the upper-left quadrant of the image (as the distance to objects in these blocks is further away, requiring smaller blocks). These smaller blocks are sized to detect an image of a vehicle 1117-N traversing the road 121 at a distance that is further from the motion detection device 105 (as compared to blocks 111-1, 111-2 and 111-3). Using these smaller blocks, the motion detection device 105 may be more likely to be able to detect movement of a speeding vehicle.

Additional smaller blocks 111-8 and 111-9 may be utilized in other areas that are further from motion detection device 105, where vehicle 1117-N movement is not expected at all (such as along the grass in front of the office buildings). These blocks 111-8 and 111-9 may also be of sufficient size to detect a vehicle 111-N (where any movement in these areas would be considered an "anomaly").

In determining blocks sizes, objects of interest that are further away require relatively smaller-sized blocks, in order to more closely focus an image of the object of interest. Therefore, distance information may be used to dictate video block sizes. It should also be understood that faster moving objects of interest require relatively larger-sized blocks, in order to be able to capture and identify images of the object of interest as it travels more quickly through a particular video block. Therefore, the speed information may be utilized to dictate video block sizes. Furthermore, if the objects of interest are relatively large, relatively larger-sized blocks are necessary in order to fully capture the object of interest in a single video block at a time (rather than multiple blocks). Therefore, the relative size of an object of interest may be used to dictate video block sizes.

Following the determination of block sizes in the upper-left quadrant of FIG. 10, the method of FIG. 11 may be repeated for other quadrants of FIG. 10, or other select portions of FIG. 10.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A method of generating a measurement vector to detect an anomaly, comprising:
    acquiring, by at least one device controlled by one or more processors, video frames of video data;
    dividing, by the one or more processors, at least one first video frame of the video data into a plurality of video blocks,
    determining, by the one or more processors, at least one first block size of at least one first video block of the plurality of video blocks, the at least one first block size being based on distance information;
    generating, by the one or more processors, a set of compressive measurements by applying a sensing matrix to the at least one first video block;
    generating, by the one or more processors, a measurement vector based on the set of compressive measurements, the measurement vector being used to detect an anomaly in the at least one first video block; and
    transmitting the measurement vector to a server for further processing to detect the anomaly, the measurement vector representing a portion of the video data that is the at least one first video block.

2. The method of claim 1, wherein the dividing of the video data into a plurality of video blocks includes using different block sizes for the video blocks, wherein each of the block sizes of the video blocks is based on the distance information.

3. The method of claim 1, further comprising:
measuring a distance to an object in the video data in order to obtain the distance information,
the at least one first block size further being based on an expected size of the object within the first video block.

4. The method of claim 3, further comprising:
estimating a speed of the object to obtain speed information,
the at least one first block size further being based on an expected size of the object and the obtained speed information.

5. The method of claim 3, wherein the measuring of the distance to the object includes,
using a distance sensor to measure the distance.

6. The method of claim 3, wherein the measuring of the distance to the object and includes,
acquiring the video data at different vantage points,
applying at least one of a stereoscopic method and a triangulation method to measure the distance.

7. The method of claim 3, wherein,
the measuring the distance to the object includes continuously measuring the distance to the object as the object moves, in order to obtain changing distance information,
wherein the at least one first block size is continuously updated based on the changing distance information.

8. A method of detecting an anomaly, comprising:
receiving, at a server, at least one measurement vector of compressive measurements for an object in at least one first video frame of video data, the at least one measurement vector being derived by applying a sensing matrix to video blocks of the at least one first video frame of the video data;
estimating, at the server, actual speed information of an object in the video blocks based on the measurement vector, the actual speed information being based on distance information for the object; and
detecting an anomaly of at least one first video block, of the video blocks, based on the actual speed information.

9. The method of claim 8, further comprising:
estimating a distance to the object, the estimated distance being the distance information;
determining a relative speed of the object based on the measurement vector; and
converting the relative speed to actual speed information for the object based on the distance information and the relative speed.

10. The method of claim 8, further comprising:
receiving the distance information from an image capture device used to capture the video data;
determining a relative speed of the object based on the measurement vector; and
converting the relative speed to actual speed information for the object based on the distance information and the relative speed.

11. A system for generating a measurement vector to detect
an anomaly, comprising:
at least one device configured to,
acquire video frames of video data,
divide at least one first video frame of the video data into a plurality of video blocks,
determine at least one first first block size of at least one first video block of the plurality of video blocks, the first block size being based on distance information,
generate a set of compressive measurements by applying a sensing matrix to the at least one first video block,
generate a measurement vector based on the set of compressive measurements, the measurement vector being used to detect an anomaly in the at least one first video block, and
transmit the measurement vector to a server for further processing to detect the anomaly, the measurement vector representing a portion of the video data that is the at least one first video block.

12. The system of claim 11, wherein,
different block sizes are used for the for the video blocks,
each of the block sizes of the video blocks is based on an expected size of the object.

13. The system of claim 11, wherein the at least one device is further configured to:
measure a distance to the object in order to obtain the distance information, the at least one first block size further being based on an expected size of the object.

14. The system of claim 13, wherein the at least one device is further configured to:
estimate a speed of the object to obtain speed information,
the at least one first block size further being based on an expected size of the object and the obtained speed information.

15. The system of claim 11, further comprising:
a distance sensor to measure a distance to the object in order to obtain distance information.

16. The system of claim 13, wherein the at least device is further configured to:
acquire the video data at different vantage points,
apply at least one of a stereoscopic method and a triangulation method to measure the distance.

17. The system of claim 13, wherein the at least one device is further configured to:
continuously measure the distance to the object as the object moves, in order to obtain changing distance information,
continuously update the at least one first block size based on the changing distance information.

18. A server for detecting an anomaly, configured to:
receive at least one measurement vector of compressive measurements for an object in at least one first video frame of video data, the at least one measurement vector being derived by applying a sensing matrix to video blocks of the at least one first video frame of the video data,
estimate actual speed information of an object in the video block based on the measurement vector, the actual speed information being based on distance information for the object, and
detect an anomaly of at least one first video block, of the video blocks based on the actual speed information.

19. The method of claim 1, wherein,
the at least one device is an image capture mechanism,
the image capture mechanism acquires the video data by capturing the video data rather than receiving the video data from another separate device.

20. The system of claim 11, wherein,
the at least one device is an image capture mechanism,
the image capture mechanism is configured to acquire the video data by capturing the video data rather than receiving the video data from another separate device.

* * * * *